United States Patent
Dodd et al.

(10) Patent No.: US 9,865,364 B2
(45) Date of Patent: Jan. 9, 2018

(54) CRDM WITH SEPARATE SCRAM LATCH ENGAGEMENT AND LOCKING

(71) Applicants: BWXT mPower, Inc., Charlotte, NC (US); BWXT Nuclear Operations Group, Inc., Lynchburg, VA (US)

(72) Inventors: Christopher D. Dodd, Lakewood, OH (US); Paul K. DeSantis, Bentleyville, OH (US); Kevin J. Stambaugh, Willowick, OH (US); Allan R. Mackovjak, Willoughby, OH (US); John P. McLaughlin, North Royalton, OH (US); Brett T. Goodyear, Twinsburg, OH (US); Michael J. Edwards, Forest, VA (US); Matthew W. Ales, Forest, VA (US)

(73) Assignees: BWXT mPower, Inc., Charlotte, NC (US); BWXT Nuclear Operations Group, Inc., Lynchburg, VA (US)

( * ) Notice: Subject to any disclaimer, the term of this patent is extended or adjusted under 35 U.S.C. 154(b) by 432 days.

(21) Appl. No.: 14/174,630

(22) Filed: Feb. 6, 2014

(65) Prior Publication Data

US 2014/0270036 A1 Sep. 18, 2014

Related U.S. Application Data

(60) Provisional application No. 61/792,235, filed on Mar. 15, 2013.

(51) Int. Cl.
*G21C 7/14* (2006.01)
*G21C 7/117* (2006.01)
*G21C 9/02* (2006.01)

(52) U.S. Cl.
CPC ............... *G21C 7/14* (2013.01); *G21C 7/117* (2013.01); *G21C 9/02* (2013.01); *Y02E 30/39* (2013.01)

(58) Field of Classification Search
CPC ..... G21C 7/06; G21C 7/08; G21C 7/10–7/12; G21C 7/14; G21C 19/00; G21C 19/28
(Continued)

(56) References Cited

U.S. PATENT DOCUMENTS

| 3,607,629 A | 9/1971 | Frisch et al. |
| 3,734,825 A | 5/1973 | Schabert et al. |

(Continued)

FOREIGN PATENT DOCUMENTS

| CN | 1157988 A | 8/1997 |
| CN | 1405788 A | 3/2003 |

(Continued)

OTHER PUBLICATIONS

International Search Report and Written Opinion for PCT/US2014/018306 dated Jun. 18, 2014.

(Continued)

*Primary Examiner* — Jack W Keith
*Assistant Examiner* — Lily C Garner
(74) *Attorney, Agent, or Firm* — Nelson Mullins Riley & Scarborough LLP

(57) ABSTRACT

A control rod drive mechanism (CRDM) configured to latch onto the lifting rod of a control rod assembly and including separate latch engagement and latch holding mechanisms. A CRDM configured to latch onto the lifting rod of a control rod assembly and including a four-bar linkage closing the latch, wherein the four-bar linkage biases the latch closed under force of gravity.

15 Claims, 45 Drawing Sheets

(58) Field of Classification Search
USPC .......................................................... 376/219
See application file for complete search history.

(56) References Cited

U.S. PATENT DOCUMENTS

| | | | |
|---|---|---|---|
| 3,765,585 A | 10/1973 | Ruoss | |
| 3,853,699 A | 12/1974 | Frisch et al. | |
| 3,857,599 A | 12/1974 | Jones et al. | |
| 3,959,072 A | 5/1976 | Dupen | |
| 3,992,255 A | 11/1976 | DeWesse | |
| 4,124,442 A | 11/1978 | Zhuchkov et al. | |
| 4,125,432 A | 11/1978 | Brooks, Jr. et al. | |
| 4,187,145 A | 2/1980 | Noyes et al. | |
| 4,411,857 A * | 10/1983 | Sridhar ............... | G21C 7/12 376/233 |
| 4,472,348 A | 9/1984 | Desfontaines | |
| 4,484,093 A | 11/1984 | Smith | |
| 4,597,934 A | 7/1986 | Bollinger et al. | |
| 4,618,471 A | 10/1986 | Defaucheux et al. | |
| 4,640,811 A | 2/1987 | Peletan | |
| 4,663,576 A | 5/1987 | Scarola et al. | |
| 4,713,210 A | 12/1987 | Germer | |
| 4,857,264 A | 8/1989 | Veronesi et al. | |
| 4,863,678 A | 9/1989 | Shockling et al. | |
| 4,876,061 A | 10/1989 | Ekeroth et al. | |
| 4,888,151 A | 12/1989 | Gjertsen et al. | |
| 4,993,864 A | 2/1991 | Gjertsen et al. | |
| 5,009,834 A | 4/1991 | Tessaro | |
| 5,064,607 A | 11/1991 | Miller et al. | |
| 5,066,451 A | 11/1991 | Tessaro | |
| 5,141,711 A | 8/1992 | Gjertsen et al. | |
| 5,200,138 A | 4/1993 | Ferrari | |
| 5,227,125 A | 7/1993 | Beneck et al. | |
| 5,307,384 A | 4/1994 | King et al. | |
| 5,361,279 A | 11/1994 | Kobsa et al. | |
| 5,606,582 A | 2/1997 | Bergamaschi | |
| 5,625,657 A | 4/1997 | Gallacher | |
| 5,778,034 A | 7/1998 | Tani | |
| 5,841,824 A | 11/1998 | Graham | |
| 6,091,790 A | 7/2000 | Ridolfo | |
| 6,236,699 B1 | 5/2001 | Ridolfo | |
| 6,275,556 B1 | 8/2001 | Kinney et al. | |
| 6,421,405 B1 | 7/2002 | Ridolfo | |
| 7,412,021 B2 | 8/2008 | Fetterman et al. | |
| 8,811,561 B2 | 8/2014 | Stambaugh | |
| 8,811,562 B2 | 8/2014 | DeSantis | |
| 2008/0253496 A1 | 10/2008 | McCarty et al. | |
| 2009/0122946 A1 | 5/2009 | Fawcett et al. | |
| 2010/0316177 A1 | 12/2010 | Stambaugh et al. | |
| 2011/0222640 A1 | 9/2011 | Desantis | |
| 2012/0148006 A1 | 6/2012 | Morris | |
| 2012/0148007 A1 | 6/2012 | Allen et al. | |
| 2012/0148008 A1 | 6/2012 | Allen et al. | |
| 2014/0270036 A1 | 9/2014 | Dodd et al. | |

FOREIGN PATENT DOCUMENTS

| | | |
|---|---|---|
| CN | 102306505 A | 1/2012 |
| CN | 102483962 A | 5/2012 |
| CN | 102568620 A | 7/2012 |
| CN | 102656642 A | 9/2012 |
| CN | 105164759 A | 12/2015 |
| WO | 2012047473 | 4/2012 |
| WO | 2012047473 A1 | 4/2012 |

OTHER PUBLICATIONS

Office Action dated Apr. 29, 2016 for U.S. Appl. No. 14/174,638.
First Office Action dated Sep. 19, 2016 for Chinese Application No. 201480022636.4.
First Office Action dated Oct. 9, 2016 for Chinese Application No. 201480022506.0.
Extended European Search Report dated Dec. 15, 2016 for EP Application No. 14768389.0.
Extended European Search Report dated Jan. 24, 2017 for EP Application No. 14769503.5.

* cited by examiner

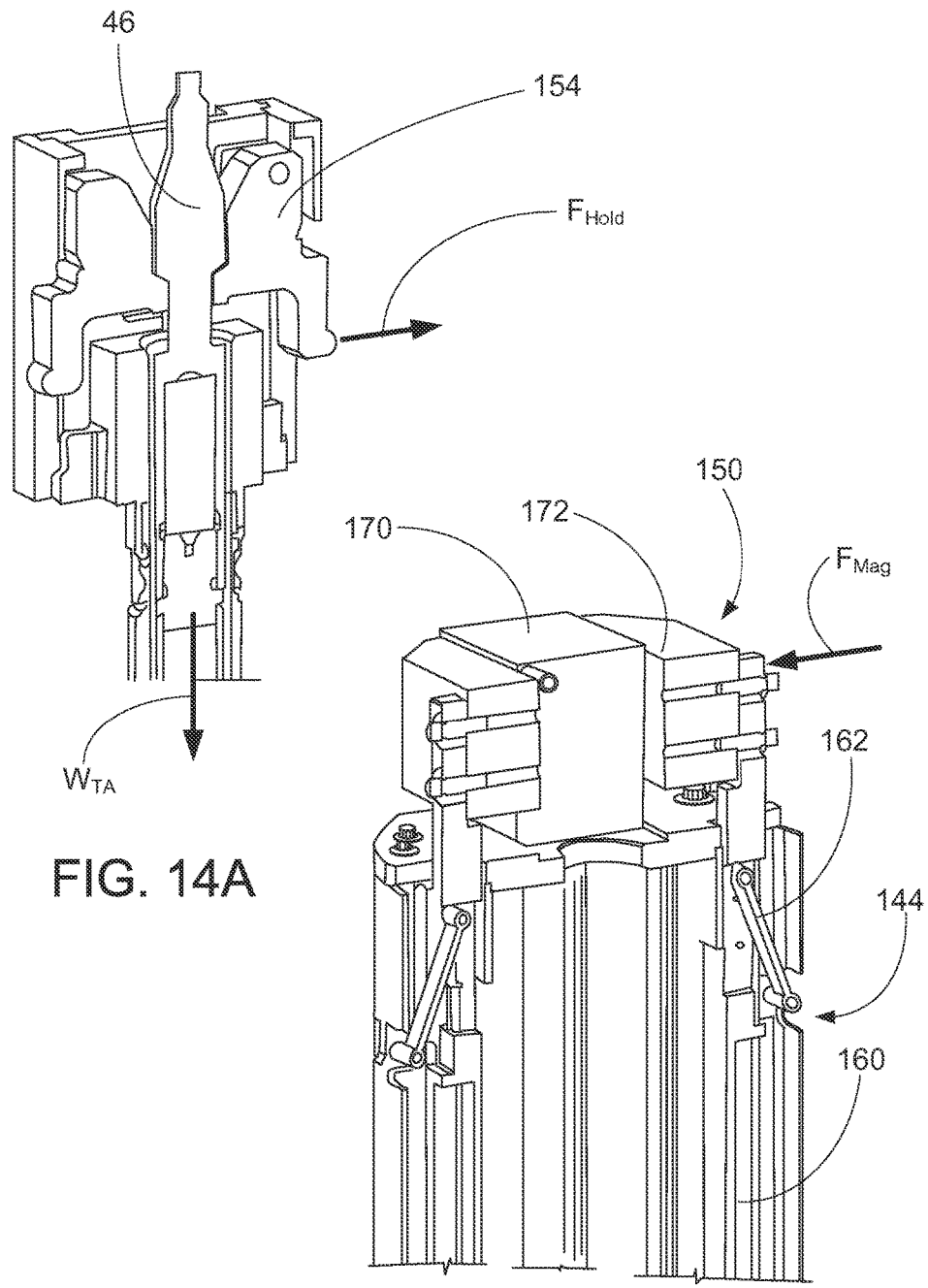

Fully Engaged
(Power On or Off)

SCAM Mode
(Power Off)

Fully Disengaged
(Power Off)

Fully Engaged
(Power On or Off)

SCAM Mode
(Power Off)

Fully Disengaged
(Power Off)

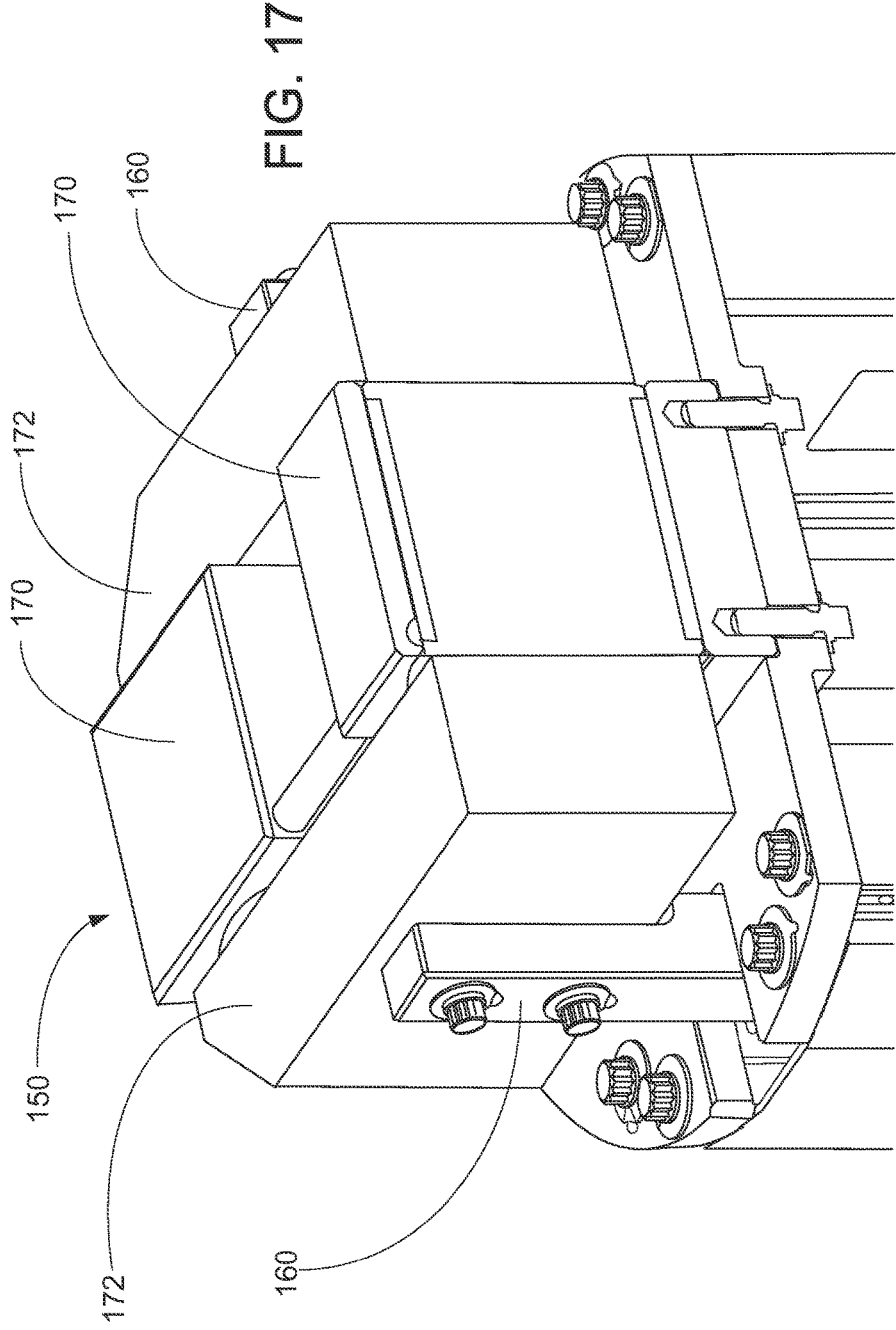

Latches at Cam Surface

Latches Reach Pocket

Ball Screw Driving Down

Ball Screw Continues Down

Latches on connecting Rod OD

Latches Full Engaged

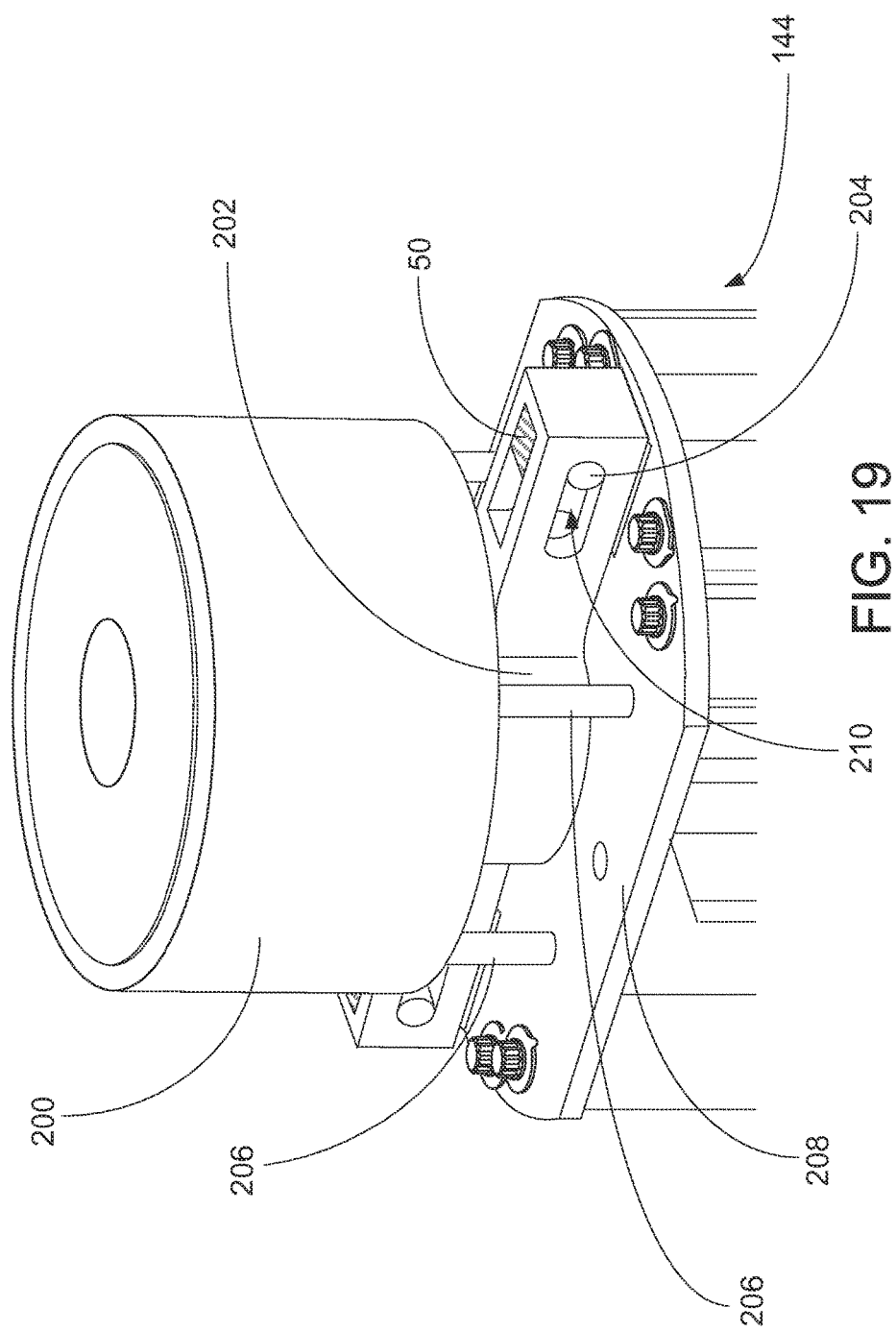

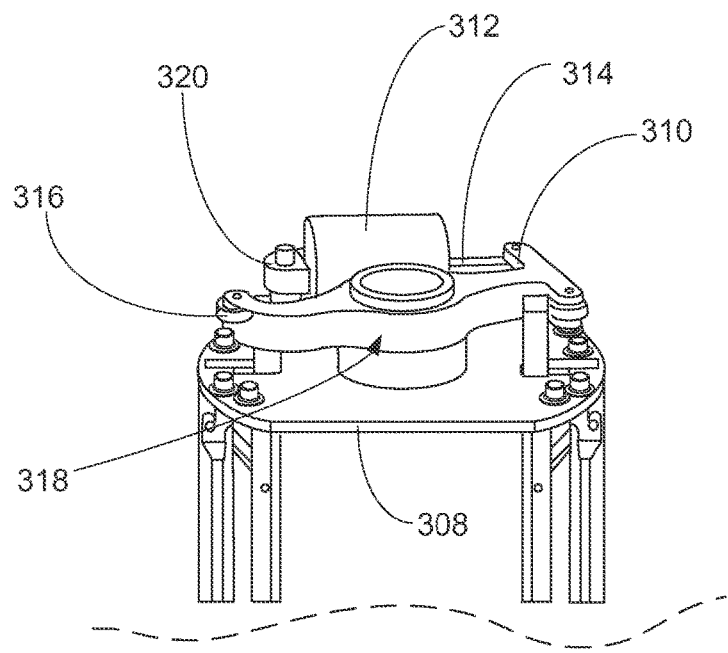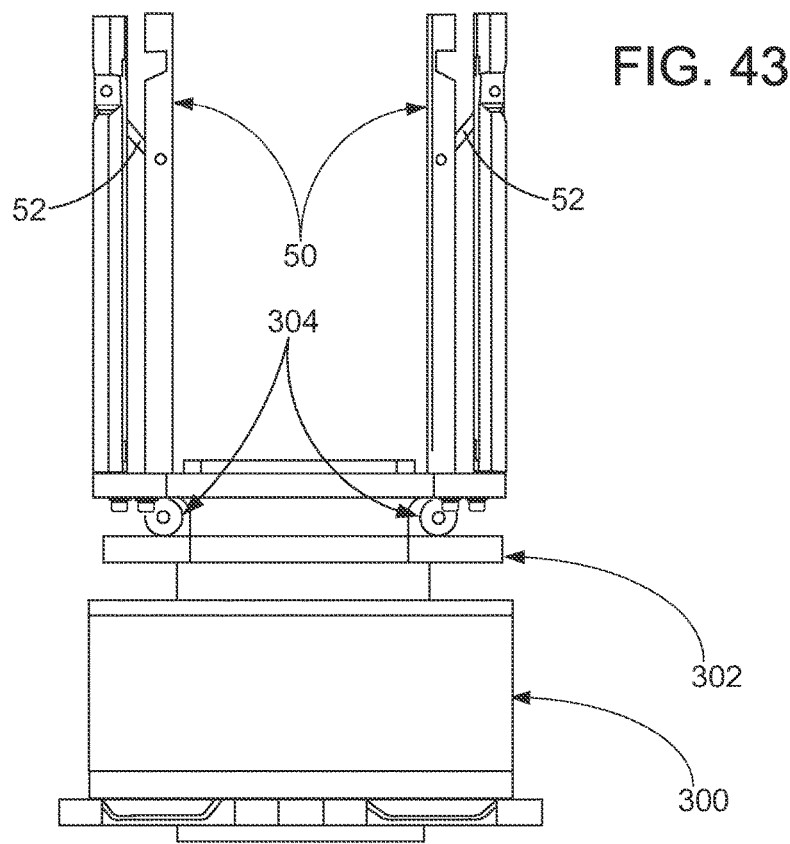
FIG. 43

CRDM WITH SEPARATE SCRAM LATCH ENGAGEMENT AND LOCKING

This application claims the benefit of U.S. Provisional Application No. 61/792,235 filed Mar. 15, 2013 and titled "CRDM DESIGNS WITH SEPARATE SCRAM LATCH ENGAGEMENT AND LOCKING". U.S. Provisional Application No. 61/792,235 filed Mar. 15, 2013 and titled "CRDM DESIGNS WITH SEPARATE SCRAM LATCH ENGAGEMENT AND LOCKING" is hereby incorporated by reference in its entirety into the specification of this application.

This invention was made with Government support under Contract No. DE-NE0000583 awarded by the Department of Energy. The Government has certain rights in this invention.

BACKGROUND

DeSantis et al., U.S. Pub. No. 2011/0222640 A1 published Sep. 15, 2011 and incorporated herein by reference in its entirety discloses (among other subject matter) a CRDM for a nuclear reactor employing a lead screw (sometimes referred to as a ball screw herein denoting specific lead screw embodiments employing ball nuts disposed between the screw and nut threadings) engaged by a motor to provide controlled vertical translation, in which a separate latch assembly connected with the lead screw latches to the lifting rod of a control rod (or to the lifting rod of a control rod assembly comprising plural control rods connected by a yoke or spider to the lifting rod). The latch is actively closed to connect the translating assembly comprising the lifting rod and the control rod(s) so that the translating assembly translates with the lead screw under control of the CRDM motor. Upon removal of the closing force, e.g. during a SCRAM, the latch opens to release the lifting rod and SCRAM the control rod(s), while the lead screw remains engaged with the CRDM motor and does not fall. In some illustrative embodiments, the latches are actively closed by cam bars that are lifted by a hydraulic piston, solenoid, or other lifting mechanism, where each cam bar is part of a four-bar linkage that moves the cam bar horizontally in response to the lifting in order to cam the latches shut. In DeSantis et al., U.S. Pub. No. 2011/0222640 A1, the four-bar linkage is arranged such that under gravity the four-bar linkage operates to move the cam bars outward so as to release the latch.

By way of non-limiting illustrative example, FIGS. 1 and 2 correspond to drawing sheets 1 and 16, respectively, of DeSantis et al., U.S. Pub. No. 2011/0222640 A1. With reference to FIG. 1, an illustrative nuclear reactor vessel of the pressurized water reactor (PWR) type is diagrammatically depicted. An illustrated primary vessel 10 contains a reactor core 12, internal steam generator(s) 14, and internal control rods 20. The illustrative reactor vessel includes four major components, namely: 1) a lower vessel 22, 2) upper internals 24, 3) an upper vessel 26 and 4) an upper vessel head 28. A mid-flange 29 is disposed between the lower and upper vessel sections 22, 26. Other vessel configurations are also contemplated. Note that FIG. 1 is diagrammatic and does not include details such as pressure vessel penetrations for flow of secondary coolant into and out of the steam generators, electrical penetrations for electrical components, and so forth. The lower vessel 22 of the illustrative reactor vessel 10 of FIG. 1 contains the reactor core 12, which can have substantially any suitable configuration. The illustrative upper vessel 26 houses the steam generator 14 for this illustrative PWR which has an internal steam generator design (sometimes referred to as an integral PWR design). In FIG. 1, the steam generator 14 is diagrammatically shown. In a typical circulation pattern the primary coolant is heated by the reactor core 12 and rises through the central riser region 32 to exit the top of the shroud 30 whereupon the primary coolant flows back down via the downcomer region 34 and across the steam generators 14. Such primary coolant flow may be driven by natural convection, by internal or external primary coolant pumps (not illustrated), or by a combination of pump-assisted natural convection. Although an integral PWR design is illustrated, it is also contemplated for the reactor vessel to have an external steam generator (not illustrated), in which case pressure vessel penetrations allow for transfer of primary coolant to and from the external steam generator. The illustrative upper vessel head 28 is a separate component, but it is also contemplated for the vessel head to be integral with the upper vessel 26. While FIG. 1 illustrates an integral PWR, in other embodiments the PWR may not be an integral PWR, that is, in some embodiments the illustrated internal steam generators may be omitted in favor of one or more external steam generators. Still further, the illustrative PWR is an example, and in other embodiments a boiling water reactor (BWR) or other reactor design may be employed, with either internal or external steam generators.

With reference to FIG. 2, a control rod system embodiment is described, e.g. suitably part of the upper internals 24 of the nuclear reactor of FIG. 1, which provides electro-magnetic gray rod functionality (i.e. continuously adjustable control rod positioning) and a hydraulic latch system providing SCRAM functionality (i.e. in an emergency, the control rods can be fully inserted in order to quickly quench the nuclear reaction, an operation known in the art as a SCRAM). The control rod system of FIG. 2 allows for failsafe SCRAM of the control rod cluster without scramming the lead screw. A motor/ball nut assembly is employed, such that a lead screw 40 is permanently engaged to a ball-nut assembly 42 which provides for axial translation of the lead screw 40 by driving a motor 44. The illustrative motor 44 is mounted on a standoff 45 that positions and bottom-supports the motor 44 in the support structure of the upper internals 24; other support arrangements are contemplated. A control rod cluster (not shown) is connected to the lead screw 40 via a lifting/connecting rod or lifting/connecting rod assembly 46 and a latch assembly 48. The lead screw 40 is substantially hollow, and the lifting/connecting rod 46 fits coaxially inside the inner diameter of the lead screw 40 and is free to translate vertically within the lead screw 40. The latch assembly 48, with spring loaded latches, is attached to (i.e. mounted on) the top of the lead screw 40. When the latches of the latch assembly 48 are engaged with the lifting rod 46 they couple the lifting/connecting rod 46 to the lead screw 40 and when the latches are disengaged they release the lifting/connecting rod 46 from the lead screw 40. In the illustrated embodiment, latch engagements and disengagements are achieved by using a four-bar linkage cam system including two cam bars 50 and at least two cam bar links 52 per cam bar 50. Additional cam bar links may be added to provide further support for the cam bar. When the cam bars 50 move upward the cam bar links 52 of the four-bar linkage also cam the cam bars 50 inward so as to cause the latches of the latch assembly 48 to rotate into engagement with the lifting/connecting rod 46. In the illustrated embodiment, a hydraulic lift assembly 56 is used to raise the cam bar assemblies 50. In an alternative embodiment (not illustrated), an electric solenoid lift system is used to raise the cam bar assemblies. When a lift force is applied to the cam system, the upward and inwardly-cammed motion of the cam bars 50 rotates the latches into engagement thereby coupling the lifting/connecting rod 46 to the lead screw 40. This causes the control rod cluster to follow lead screw motion. When the lift force is removed, the cam bars 50 swing down and are cammed outward by the cam bar links 52 of the four-bar linkage allowing the latches of the latch assembly 48 to rotate out of engagement with the lifting/connecting rod 46. This de-couples the lifting/connecting rod 46 from the lead screw 40 which causes the control rod cluster to SCRAM. During a SCRAM, the lead screw 40 remains at its current hold position. After the SCRAM event, the lead screw 40 is driven to the bottom of its stroke via the electric motor 44. When the lift force is reapplied to the cam system via the hydraulic lift assembly 56, the latches of the latch assembly 48 are re-engaged and the lifting rod 46 is re-coupled to the lead screw 40, and normal operation can resume. Other latch drive modalities are contemplated, such as a pneumatic latch drive in which pneumatic pressure replaces hydraulic pressure in the illustrated lift assembly 56. In FIG. 2, the lead screw 40 is arbitrarily depicted in a partially withdrawn position for illustration purposes. The latching assembly 48 is attached to (i.e. mounted on) the top of the lead screw 40. The ball nut 42 and motor 44 are at the bottom of the control rod drive mechanism (CDRM), the latch cam bars 50 extend for the full length of mechanism stroke, and the hydraulic lift system 56 is located at the top of the mechanism. In some embodiments, the CRDM of FIG. 2 is an integral CDRM in which the entire mechanism, including the electric motor 44 and ball nut 42, and the latching assembly 48 are located within the reactor pressure vessel 10 (see FIG. 1) at full operating temperature and pressure conditions. Further illustrative embodiments of CRDM designs employing the cam bars with four-bar linkages are described in DeSantis et al., U.S. Pub. No. 2011/0222640 A1, which is incorporated herein by reference in its entirety.

BRIEF SUMMARY

In some illustrative embodiments, a control rod drive mechanism (CRDM) comprises: a lead screw engaged by a CRDM motor; a lifting rod supporting at least one control rod; latches secured to the lead screw and configured to latch an upper end of the lifting rod to the lead screw; a latch engagement mechanism configured to close the latches onto the upper end of the lifting rod; and a latch holding mechanism configured to hold the latches closed; wherein the latch holding mechanism is separate from the latch engagement mechanism. In some embodiments the CRDM further comprises a four-bar linkage including cam bars, the four-bar linkage configured to drive the cam bars inward to cam the latches closed responsive to operation of the latch engagement mechanism, the latch holding mechanism configured to hold the cam bars in the inward position to keep the latches closed. In some such embodiments the four-bar linkage is configured to bias the latches closed under force of gravity. In some embodiments the latch engagement mechanism operates responsive to lowering the latches over the upper end of the lifting rod and is not effective to keep the latches closed when the latches are raised again after the latch engagement mechanism operates.

In some illustrative embodiments, a control rod drive mechanism (CRDM) comprises: a lead screw engaged by a CRDM motor; a lifting rod supporting at least one control rod; latches secured to the lead screw and configured to latch an upper end of the lifting rod to the lead screw; a latch engagement mechanism configured to close the latches onto the upper end of the lifting rod; and a latch holding mechanism configured to hold the latches closed; wherein the latch engagement mechanism is not effective to keep the latches closed when the latches are supporting the weight of the lifting rod and supported at least one control rod. In some embodiments the latch holding mechanism is not effective to close the latches. In some embodiments the CRDM further comprises a four-bar linkage including cam bars, the four-bar linkage configured to drive the cam bars inward to cam the latches closed responsive to operation of the latch engagement mechanism, the latch holding mechanism configured to hold the cam bars in the inward position to keep the latches closed. In some such embodiments the four-bar linkage is configured to bias the latches closed under force of gravity. In some embodiments the latch engagement mechanism operates responsive to lowering the latches over the upper end of the lifting rod and is not effective to keep the latches closed when the latches are raised again after the latch engagement mechanism operates.

In some illustrative embodiments, a control rod drive mechanism (CRDM) comprises: a lead screw engaged by a CRDM motor; a lifting rod supporting at least one control rod; latches secured to the lead screw and configured to latch an upper end of the lifting rod to the lead screw; and a four bar linkage including cam bars, the four bar linkage configured to drive the cam bars inward to cam the latches closed responsive to operation of a latch engagement mechanism; wherein the four bar linkage is configured to bias the latches closed under force of gravity.

In some illustrative embodiments, a control rod drive mechanism (CRDM) includes: a CRDM motor; an element translated under control of the CRDM motor;

a latch configured to latch a lifting rod supporting at least one control rod with the element translated under control of the CRDM motor; a latch engagement mechanism configured to close the latch onto the lifting rod; and a latch holding mechanism, separate from the latch engagement mechanism, configured to hold the latch in its closed position.

In some illustrative embodiments, a control rod drive mechanism (CRDM) includes: a CRDM motor; an element translated under control of the CRDM motor; a latch configured to latch a lifting rod supporting at least one control rod with the element translated under control of the CRDM motor; and a four bar linkage including cam bars, the four bar linkage configured to cam the latches closed responsive to operation of a latch engagement mechanism; wherein the four bar linkage is configured to bias the latches closed under force of gravity.

In some illustrative embodiments, a control rod drive mechanism (CRDM) is configured to latch onto the lifting rod of a control rod assembly and includes separate latch engagement and latch holding mechanisms.

In some illustrative embodiments, a control rod drive mechanism (CRDM) is configured to latch onto the lifting rod of a control rod assembly and includes a four-bar linkage closing the latch, wherein the four-bar linkage biases the latch closed under force of gravity.

BRIEF DESCRIPTION OF THE DRAWINGS

The invention may take form in various components and methods of manufacturing. The following is a brief description of the drawings, which are presented for the purposes of illustrating the exemplary embodiments disclosed herein and not for the purposes of limiting the same.

FIGS. 7-18 diagrammatically show aspects of a CRDM embodiment with a self-engaging cam/latch system and electromagnetic holding system as described herein. With particular reference to FIG. 18 (inclusive of FIGS. 18A-F)

FIGS. 19-22 diagrammatically show aspects of another illustrative holding mechanism suitably used in, for example, the CRDM of FIGS. 3-6 or the CRDM of FIGS. 7-18.

FIGS. 39-48 diagrammatically show aspects of another illustrative CRDM including a holding mechanism and a variant latching mechanism.

DETAILED DESCRIPTION OF THE PREFERRED EMBODIMENTS

Figure 1:
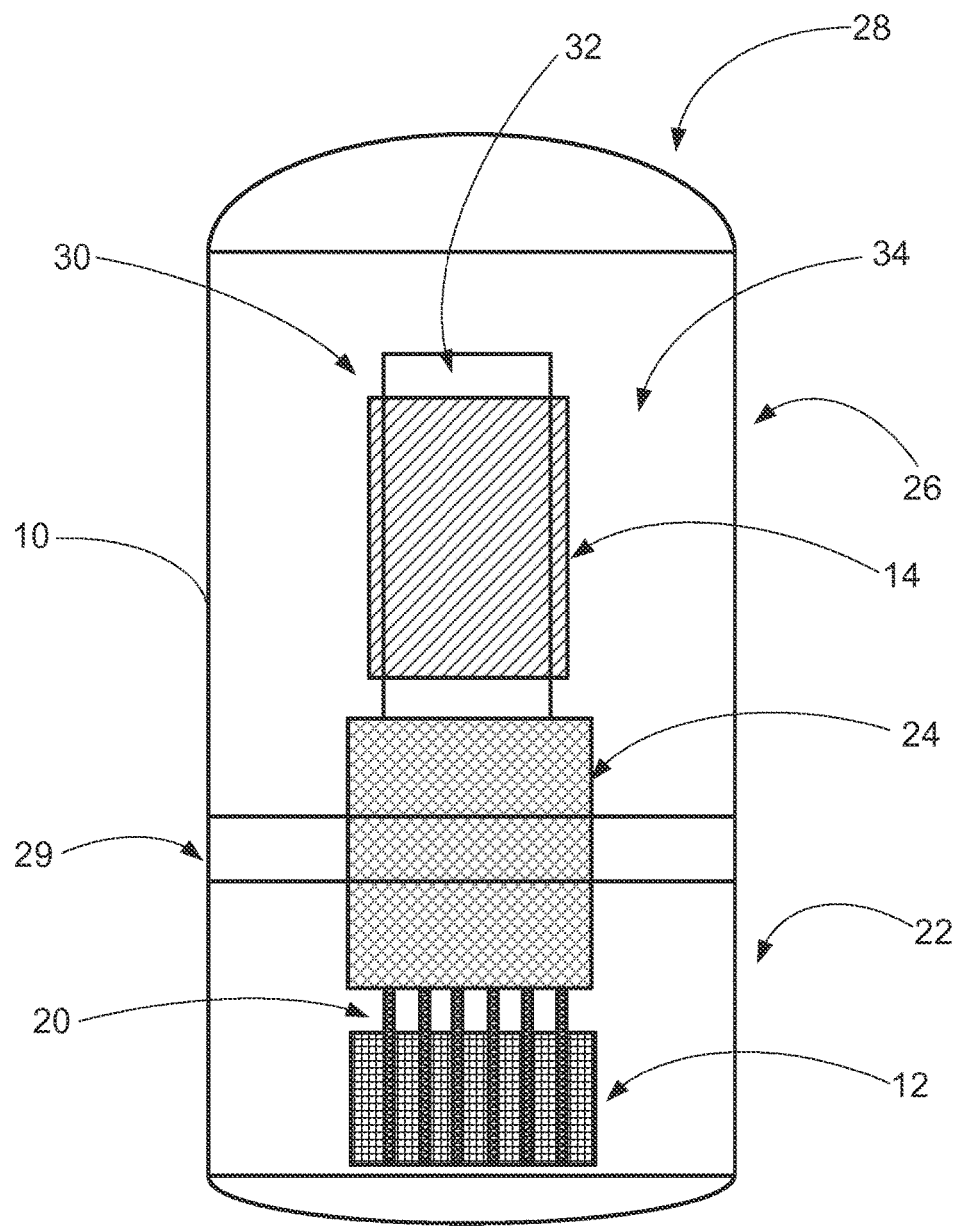
FIG. 1 diagrammatically shows a nuclear reactor illustrated in DeSantis et al., U.S. Pub. No. 2011/0222640 A1.

Disclosed herein are improvements upon CRDM designs of DeSantis et al., U.S. Pub. No. 2011/0222640 A1 employing the cam bars with four-bar linkages.

In one aspect, the CRDM is improved by separating the latch engagement and latch holding functions. This may entail increasing the number of CRDM components since a separate latch engagement mechanism and latch holding mechanism are provided. However, it is recognized herein that this increase in parts is offset by improved energy efficiency. This is because the latch engagement is a momentary event that occurs very infrequently (possibly only once per fuel cycle). In contrast, the latch holding operation is performed over the entire fuel cycle (barring any SCRAM events). By employing separate latch engagement and holding mechanisms, the latch holding mechanism is not required to perform the relatively higher-energy operation of moving the latches from the unlatched position to the latched position. Accordingly, the latch holding mechanism can be made more energy efficient.

In another aspect, the latch engagement mechanism, which no longer needs to perform the latch holding function, can be substantially improved. In one embodiment (see FIGS. 3-6), the latch engagement mechanism comprises a lower camming link built into the lower portion of the CRDM, which is engaged by the latch box or housing as it is lowered toward the lifting rod (which, due to its not currently being latched, is typically located at its lowermost position corresponding to maximum insertion of the control rods into the nuclear reactor core). The lowering latch housing engages the lower camming link which is curved and mounted pivotally so that an end distal from the end cammed by the latch housing is caused to drive the cam bars inward, into the latched position. Once in the latched position, the separate latch holding mechanism is engaged, and thereafter when the latch housing is raised by the CRDM motor and lead screw the lower camming link disengages but the latch remains closed by action of the separate latch holding mechanism.

In another aspect, the latch engagement mechanism is implemented as a self-engaging cam/latch system (see FIGS. 7-18). This approach is achieved by modifying the four-bar linkage such that under gravity the four-bar linkage operates to move the cam bars inward so as to engage the latch. Similar to the latch engagement of FIGS. 3-6, this latch engagement activates upon lowering the latch housing over the upper end of the lifting rod. In the self-engaging approach, the latch is normally closed due to the four-bar linkage defaulting to moving the cam bars inward under force of gravity, and the upper end of the lifting rod includes a camming surface that cams the latch open as the latch housing is lowered over the upper end of the lifting rod. Once over the camming surface of the upper end, the latch again closes under force of gravity due to the orientation of the four-bar linkage. The separate latch holding mechanism is then activated to hold the cam bars in the inward position to keep the latch closed. Surprisingly, this embodiment is capable of reliable SCRAM even though the four-bar linkage is biasing the latch closed under gravity. This is because the four-bar linkage is designed with its links at large angles and of relatively long length so that the force necessary to open the latches against the gravitational closing bias of the four-bar linkage is quite modest. (See FIGS. 7-18 and related discussion for details). Accordingly, the weight of the translating assembly (i.e. the lifting rod and the attached control rod or rods and optional spider or yoke) is sufficient to easily overcome the closing bias of the four-bar linkage.

In further disclosed aspects, various embodiments of the latch holding mechanism are disclosed. See FIG. 19 and following.

Figure 2:
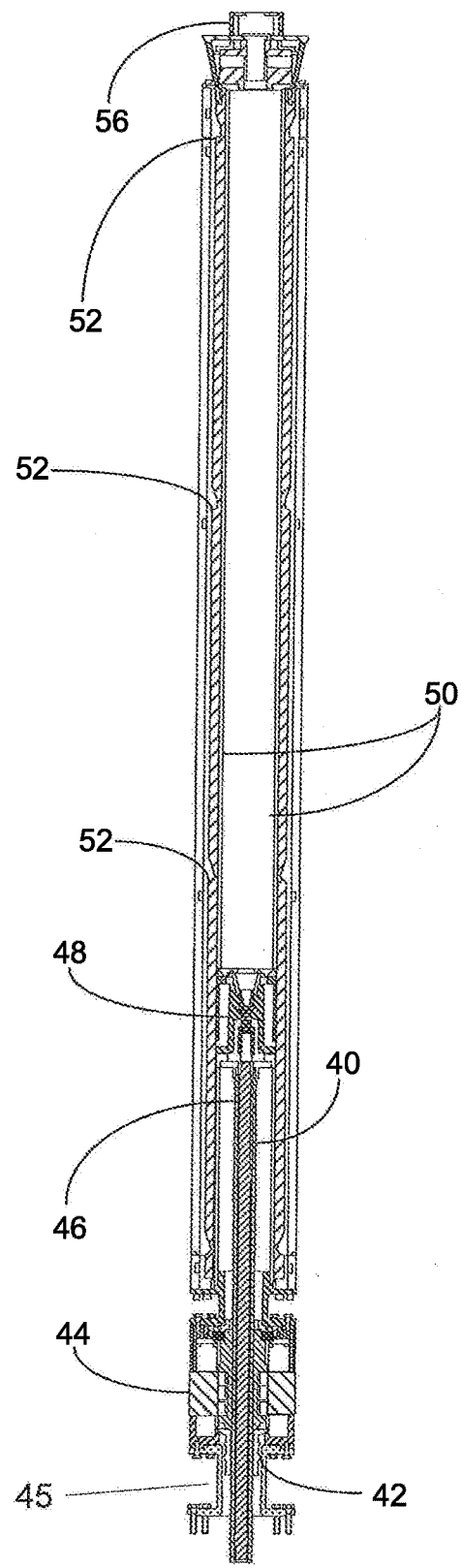
FIG. 2 diagrammatically shows a control rod system illustrated in DeSantis et al., U.S. Pub. No. 2011/0222640 A1.

In the CRDM system of FIG. 2, the lift system 56 (hydraulic as shown, or alternatively an electric solenoid) supports both latch actuation and long term engagement during hold and translational operations. In the variant embodiments described in the following, features of like functionality to the CRDM of FIG. 2 (for example, the cam bars 50 and the cam bar links 52 of the four-bar linkage) are labeled with like reference numbers.

Figure 3:
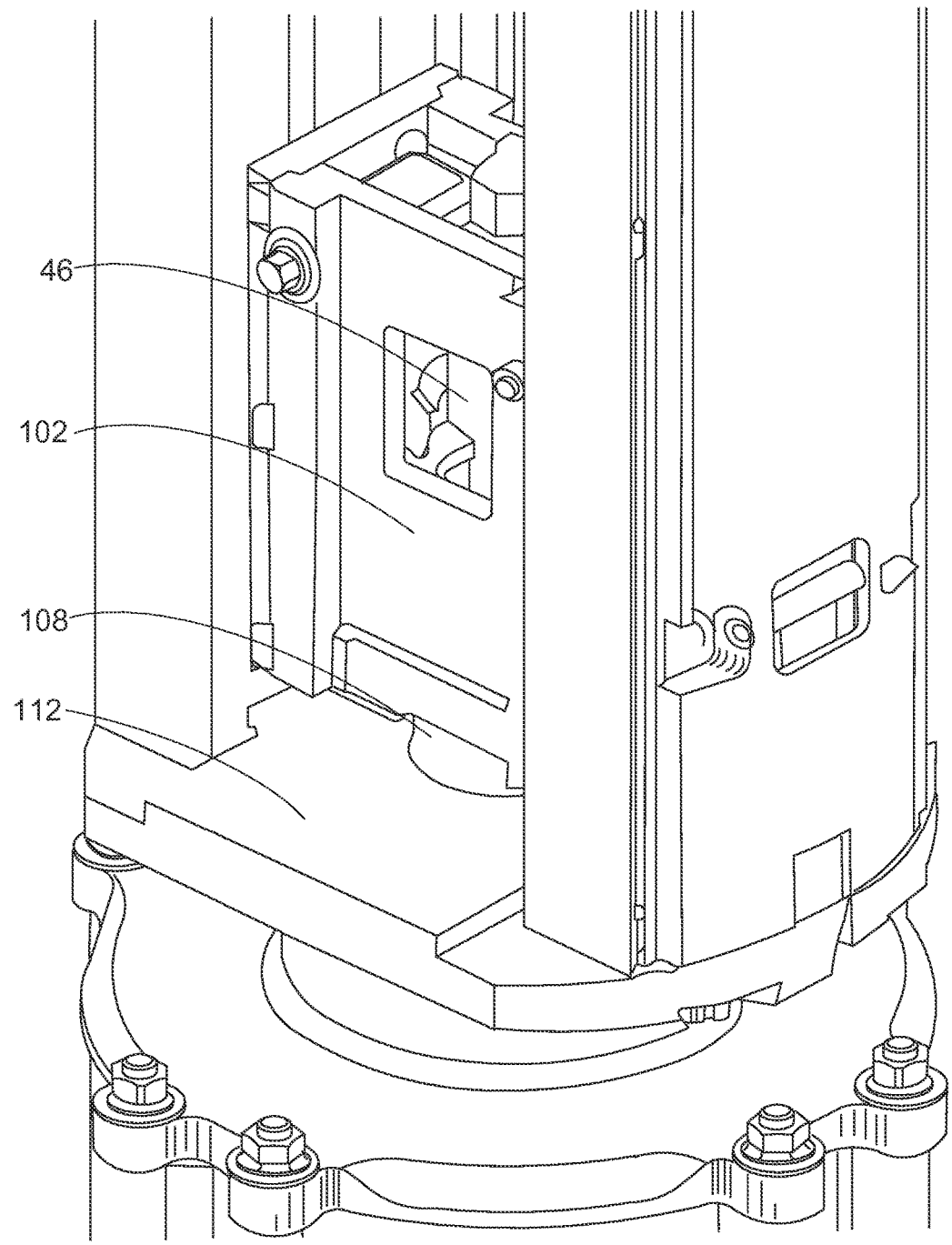
FIG. 3 diagrammatically shows an isometric view of a CRDM with the control rod fully inserted.
Figure 4:
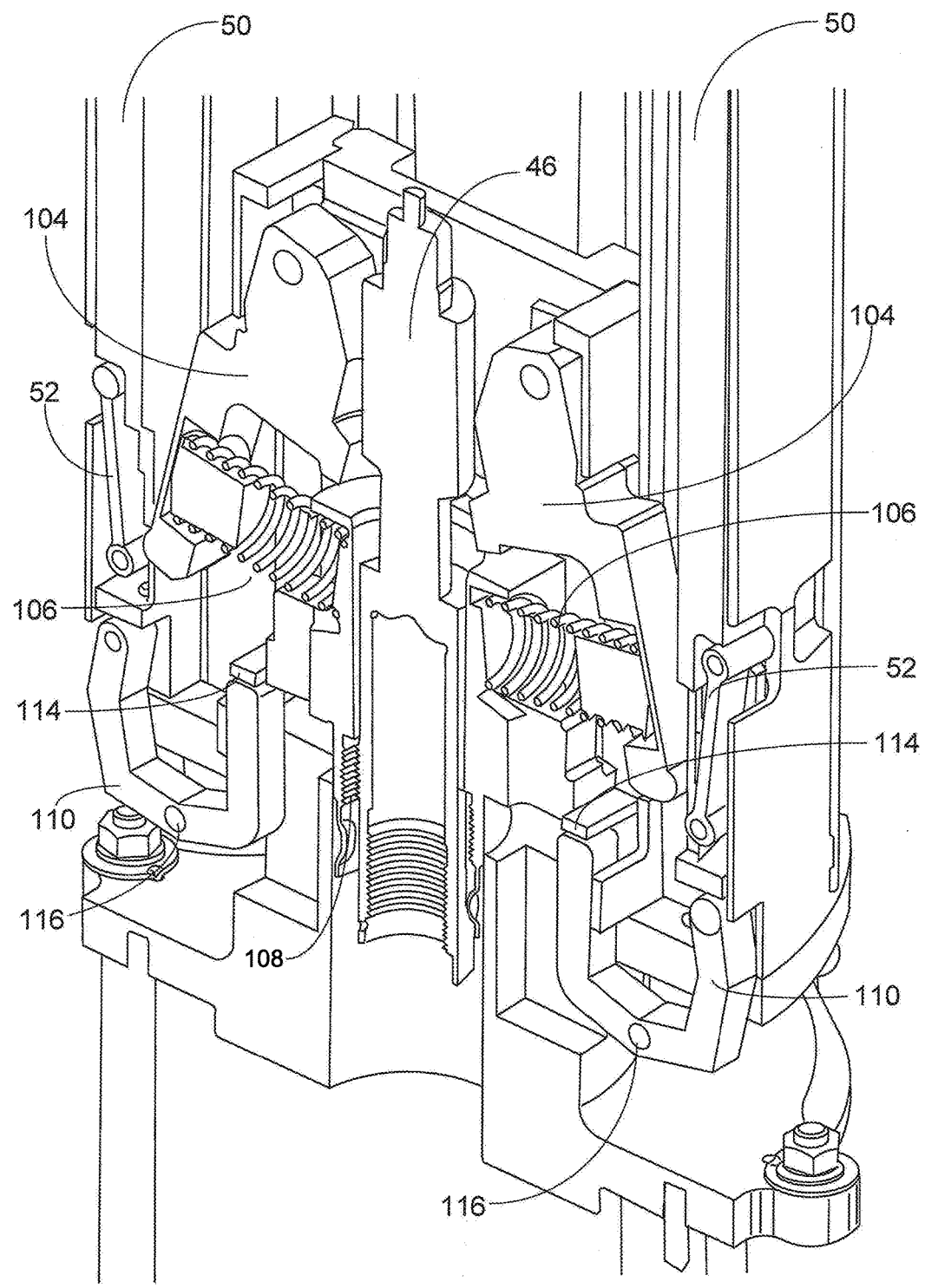
FIGS. 4 and 5 diagrammatically show isometric and side cutaway views, respectively, of the CRDM of FIG. 3 with the latching device disengaged.
Figure 5:
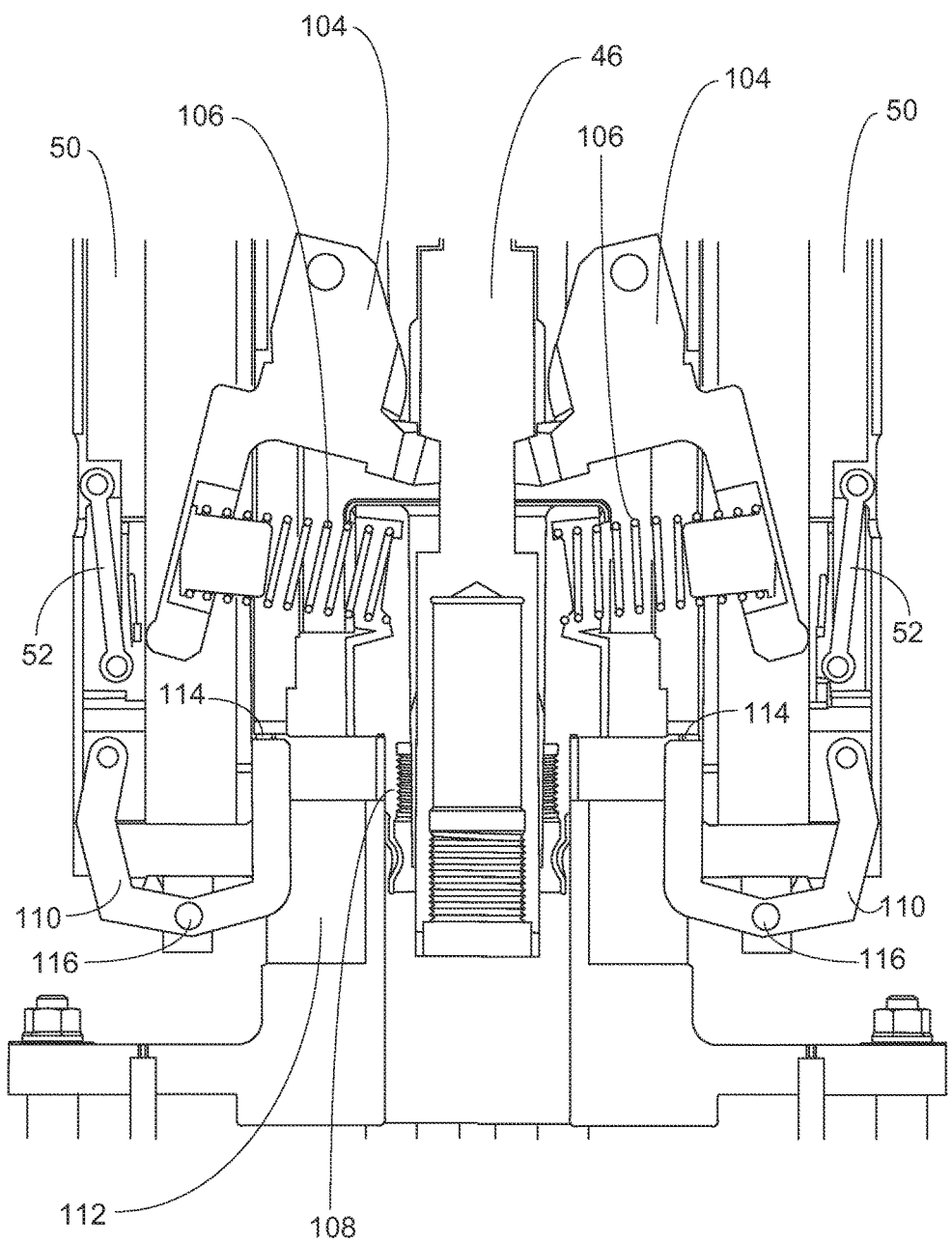
Figure 6:
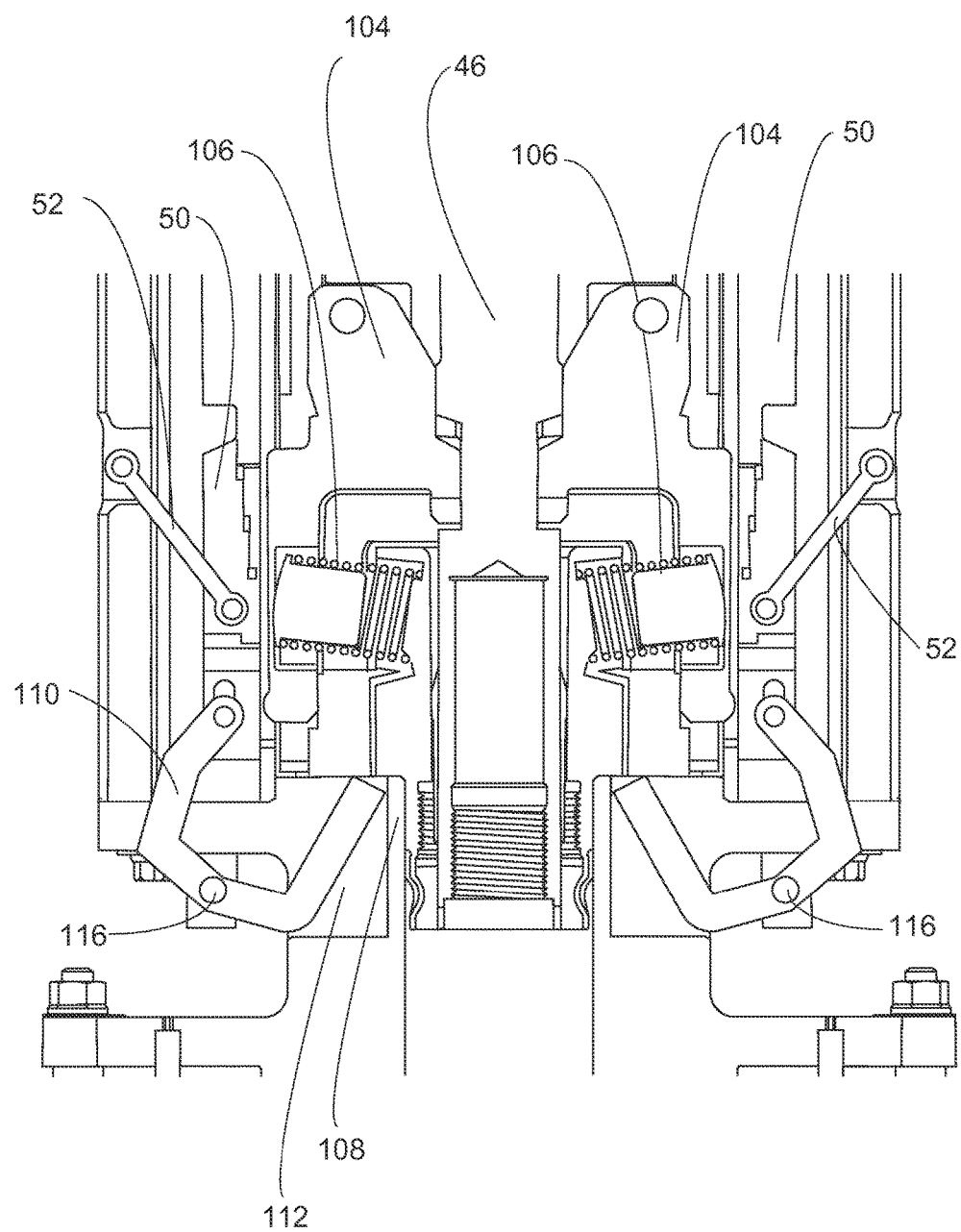
FIG. 6 diagrammatically shows a side cutaway view of the CRDM of FIGS. 3-5 with the latch engaged.

With reference to FIGS. 3-6 and with contextual reference to FIG. 2, a CRDM embodiment is described in which latch activation and long term hold/translation functions are separated, resulting in reduction of operational power requirements. The CRDM comprises a mechanically actuated latching device. FIG. 3 shows an isometric view of the CRDM with the control rod (not shown) fully inserted. FIGS. 4 and 5 show isometric and side cutaway views, respectively, with the latching device disengaged. FIG. 6 shows a side cutaway view with the latch engaged. The latching mechanism utilizes the CRDM motor 44, the lead screw 40 (e.g. threadedly engaged with the CRDM motor 44 via the ball screw 42 as shown in FIG. 2) and a latch box 102 to engage the latches 104 to the top of the connecting (i.e. lifting) rod 46. Springs 106 bias the latches 104 open. The latch box 102 and spring-biased latches 104 form a latch assembly corresponding to the latch assembly 48 of FIG. 2. In FIGS. 3-6, a mounting feature 108 is shown via which the latch box 102 is mounted to the top of the lead screw 40, but the lead screw itself is omitted in FIGS. 3-6. Similarly, only the top of the lifting rod 46 is shown in FIGS. 3-6, but it is to be understood that the lifting rod 46 extends downward as shown in contextual FIG. 2.) In this operation, the control rod or rods are initially fully inserted and the upper end of the lifting rod 46 is disengaged from the latches 104.

The CRDM motor 44 is then operated to cause the lead screw 40 to translate downward, thus lowering the latch box 102 toward the upper end of the lifting rod 46. The downward force supplied by the CRDM motor 44 through the ball screw 42 moves the latch box 102 into contact with a lower camming link 110 built into a lower portion 112 of the CRDM. FIGS. 4 and 5 show isometric cutaway and side cutaway views, respectively, of the state in which the latch box 102 is just beginning to contact the lower camming link 110 at a contact area 114.

As seen in FIG. 6, the continued application of motor torque forces the latch box 102 downward so as to press the lower camming link 110 downward resulting in a rotary action about a pivot point 116. This rotary action lifts and translates the cam bars 50 into the engaged position so as to cam against and close the latches 104 in the latch box 102.

A separate holding mechanism (not shown in FIGS. 3-6 but embodiments of which are disclosed elsewhere in this application) keeps the cam bars 50 engaged as the latch box 102 is translated back upward after the latch engagement so as to lift the lifting rod 46 and attached control rod(s) upward. (Note that the control rods are not shown in FIGS. 3-6).

This approach of the embodiment of FIGS. 3-6 separates latch activation and long term hold/translation functions of the CRDM, resulting in reduction of operational power requirements. (Again, FIGS. 3-6 illustrate only the latch activation—suitable embodiments of the long term hold/translation component are described elsewhere in this application.) The separation of latch activation and long term hold/translation functions simplifies the latching assembly making it easier to manufacture and less expensive. The mechanically actuated latching device described with reference to FIGS. 3-6 is electrically operated (assuming the lead screw 40 is driven by the electric CRDM motor 44 as per FIG. 2). In combination with an electrically operated holding mechanism (again, disclosed elsewhere in this application), this constitutes an all-electric CRDM.

With reference to FIGS. 7-18, a CRDM embodiment with self-engaging cam/latch system and electromagnetic holding is described. In these CRDM embodiments, the four-bar linkage is modified such that under gravity the four-bar linkage operates to move the cam bars 50 inward so as to engage the latch. These CRDM embodiments also include a holding mechanism that only holds the latch and does not perform the engagement.

Figures 7, 8:
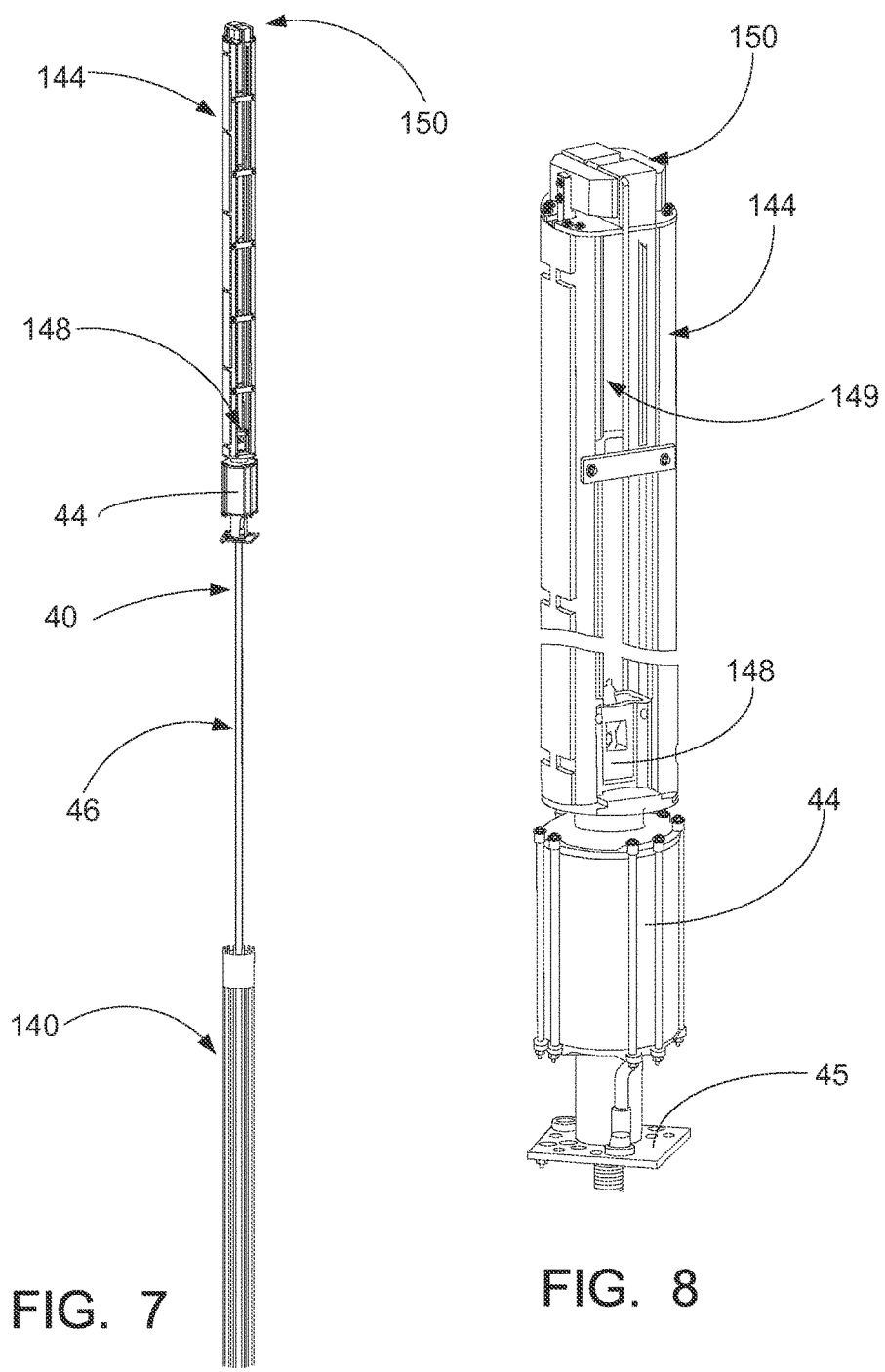

With reference to FIG. 7, the CRDM is shown in combination with a control rod assembly 140 connected by the lifting/connecting rod 46 via the lead (or ball) screw 40 to the CRDM which includes the motor assembly 44, a modified cam assembly 144 (with a modified four-bar linkage) and latch assembly 148.

With reference to FIG. 8, an enlarged view of the CRDM of FIG. 7 is shown, including the motor 44 mounted on the standoff 45, the cam assembly 144 with modified four-bar linkage, the latch assembly 148, and an optional position sensor 149. The illustrative CRDM also includes an electromagnet holding system 150 at the top of the cam assembly 144.

Figure 9:
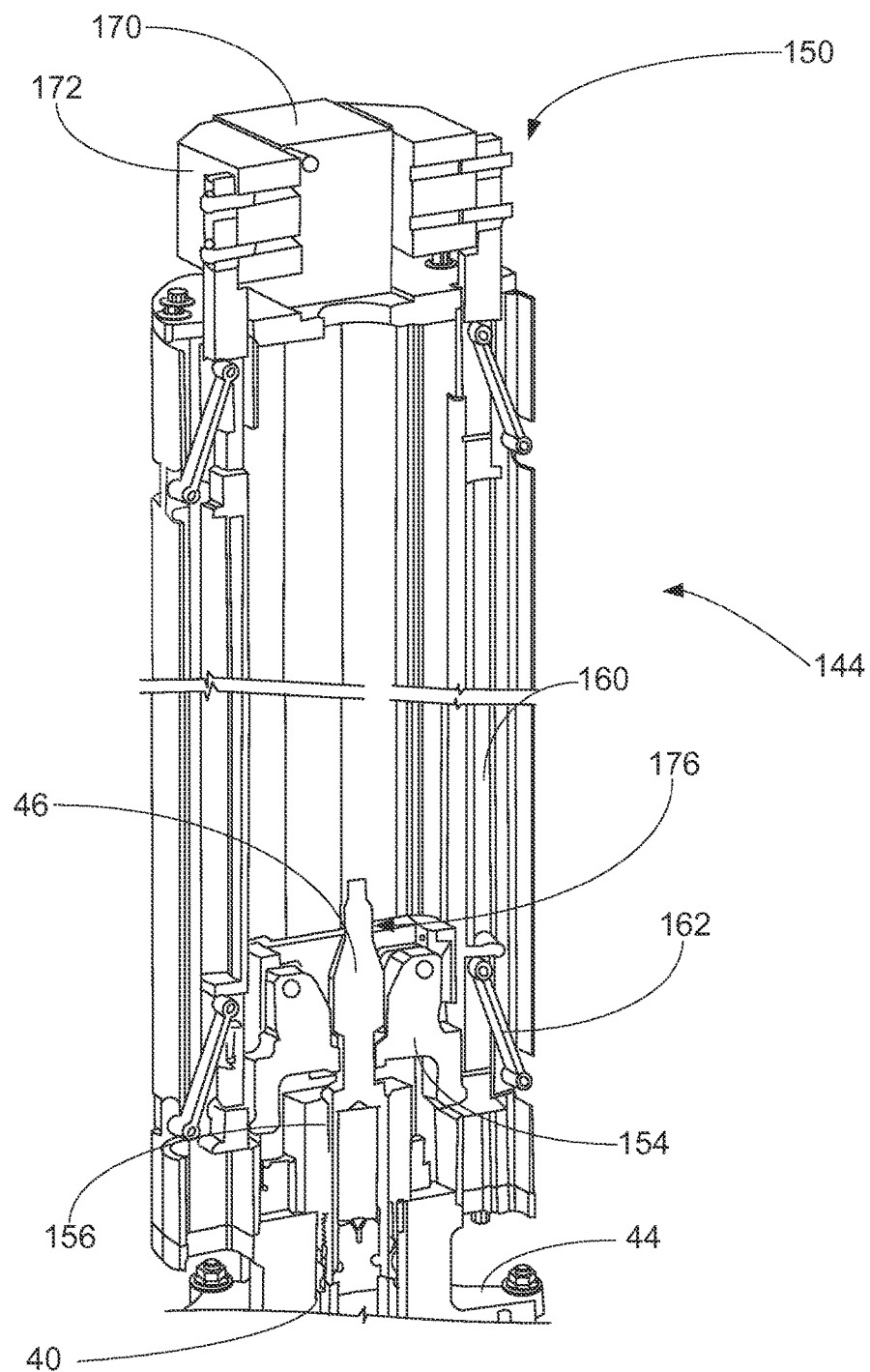
Figure 10:
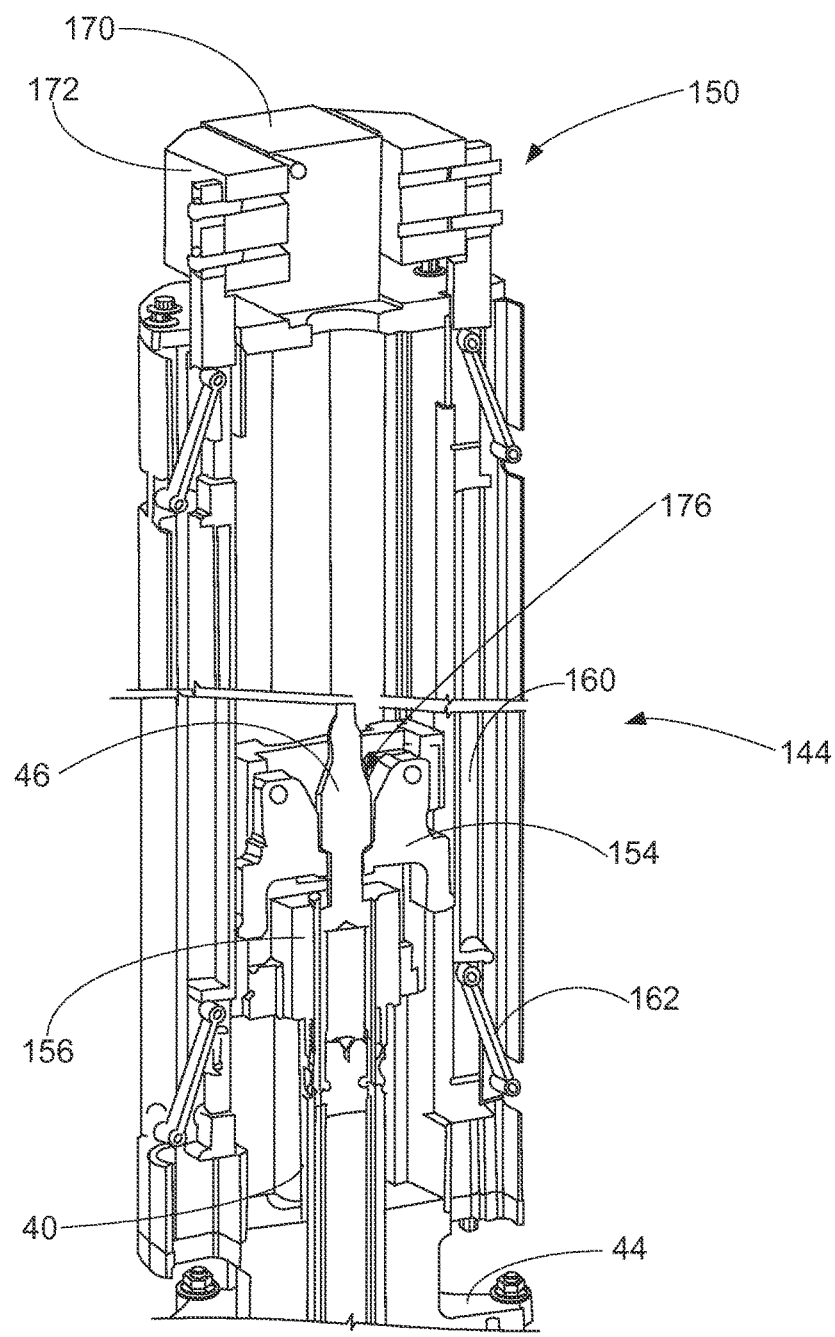

With reference to FIGS. 9 and 10, which show cutaway perspective view of the CRDM in SCRAM mode (fully inserted) and in normal operating mode (translating or holding the control rods), respectively, the CRDM allows for failsafe SCRAM of the control rod (or control rod cluster) 140 without the need to SCRAM the lead screw 40. The lead screw/ball nut assembly is permanently attached to the electric motor 44 (only the top of which is visible in FIG. 9) which provides for its axial translation. The control rod cluster 140 is connected to the lead screw 40 via a connecting (i.e. lifting) rod 46 and the latch assembly 148 (see FIG. 7). As seen in FIG. 9, the lead screw 40 is hollow, and the lifting rod 46 fits inside the lead screw inner diameter (ID) and is free to translate vertically within the lead screw 40. The latch assembly, with two latches 154 (although three or more latches are contemplated), is secured to the top of the lead screw 40 by a lead screw/latch assembly coupling 156 (e.g., a latch housing mounted to the upper end of the lead screw). When the latches 154 are engaged with the lifting rod 46 they couple the lifting rod 46 to the lead screw 40 (normal operation) so that the lead screw 40 and lifting rod 46 move together. When the latches 154 are disengaged they release the lifting rod 46 from the lead screw 40 (an event referred to as SCRAM).

Latch engagements and disengagements are achieved by using the four-bar linkage cam system 144 with a cam bar assembly provided for each latch including a cam bar 160 and cam bar links 162. However, unlike the embodiment of FIG. 2, in the CRDM embodiments of FIGS. 7-18 the cam bar links 162 are oriented such that when gravity causes the cam bars 160 to move downward the four-bar linkage action rotates the cam bars 160 inward thereby causing the latches 154 to rotate into engagement with the lifting rod 46. Because of this self-engaging feature, there is no action required to engage the latches 154 to the lifting rod 46 (other than operating the CRDM motor 44 to lower the latch assembly 148 over the upper end of the lifting rod 46) and there are no springs for biasing the latches 154 (compare with springs 106 of the embodiment of FIGS. 3-6).

Thus, force of gravity is sufficient to cause the cam bars 160 to cam the latches 154 to engage the lifting rod 46 when the lifting rod is in its lowermost position (corresponding to the control rods being fully inserted). However, force of gravity is not capable of keeping the latches 154 engaged when the CRDM of FIGS. 7-18 is operated to lift the control rod assembly 140 via the lifting rod 46. Thus, the separate holding mechanism 150 is provided, which includes electromagnets 170 and magnetic couplers 172 each connected with the upper end of a respective one of the cam bars 160. In the embodiments described herein with reference to FIGS. 7-18, the illustrative electromagnet holding system 150 is incorporated to hold the cam bars 160, and thus the latches 154, in full engagement for long term hold and translational operations. When power is removed from the electromagnets 170 (as per FIG. 9) the weight of the translating assembly 140, 46 is sufficient to rotate the latches 154 and cams bars 160 out of engagement thereby causing the CRDM to SCRAM. (The term "translating assembly" or similar phraseology refers to the combination of the lifting rod 46 and the control rod assembly 140 including a set of control rods connected with the lifting rod 46 by a yoke or spider.) While the electromagnet holding mechanism embodiment 150 is described for illustrative purposes in FIGS. 7-18, elsewhere in this application other holding mechanism embodiments are disclosed that may be substituted for the holding mechanism 150.

After the SCRAM event the lead screw 40 is driven back to the bottom of its stroke via the electric CRDM motor. As the latch assembly nears the bottom of the stroke it automatically re-engages with the lifting rod 46 by cam action against the conical surface 176 of the upper end of the connecting rod 46. The same automatic re-engagement action could also be used to re-engage in the event that a control rod becomes stuck and the SCRAM does not complete.

The overall CRDM assembly is shown in FIGS. 7-8. Note that the lead screw 40 may also be referred to as a "ball screw", which is an equivalent term when the threaded engagement employs a ball nut (that is, a threaded nut/screw coupling with ball bearings disposed in the threads). The layout of the CRDM of FIGS. 7-18 is similar to illustrative CRDMs described with reference to FIG. 2. However, in the CRDM of FIGS. 7-18 the electromagnet holding system 150 at the top of the CRDM has replaced the hydraulic (or solenoid) lift assembly 56 of CRDM embodiments of FIG. 2.

FIG. 9 illustrates the CRDM of FIGS. 7-18 in full SCRAM mode with the ball screw 40 and control rod assembly fully inserted. In FIG. 9 only the upper end of the lifting rod 46 (also sometimes called a connecting rod) is visible. The reversed (as compared with embodiments of FIG. 2) cam link orientation causes the four-bar linkage action under downward gravitational weight of the cam bars 160 to rotate the cam bars 160 inward into full engagement thereby causing the latches 154 to be fully engaged with (the upper end of) the lifting rod 46 of the translating assembly. This is the normal self-engaged cam bar position with no load on the latches from the translating assembly and no electromagnet holding force applied by the electromagnet holding system 150.

FIG. 10 illustrates normal CRDM operation (either long term hold mode or translation of the control rod assembly under control of the CRDM motor). For this operating condition the electromagnets 170 are powered on to hold the cam bars 160, and thus the latches 154, in full engagement so that they can carry the maximum translating assembly weight force. As seen in FIG. 10, the cam bars 160 extend above the top plate of the cam housing where the magnetic couplers 172 are attached. These couplers 172, made of 410 SS magnetic material in a suitable embodiment, complete the magnetic circuit for optimum electromagnet holding force.

Figure 11:
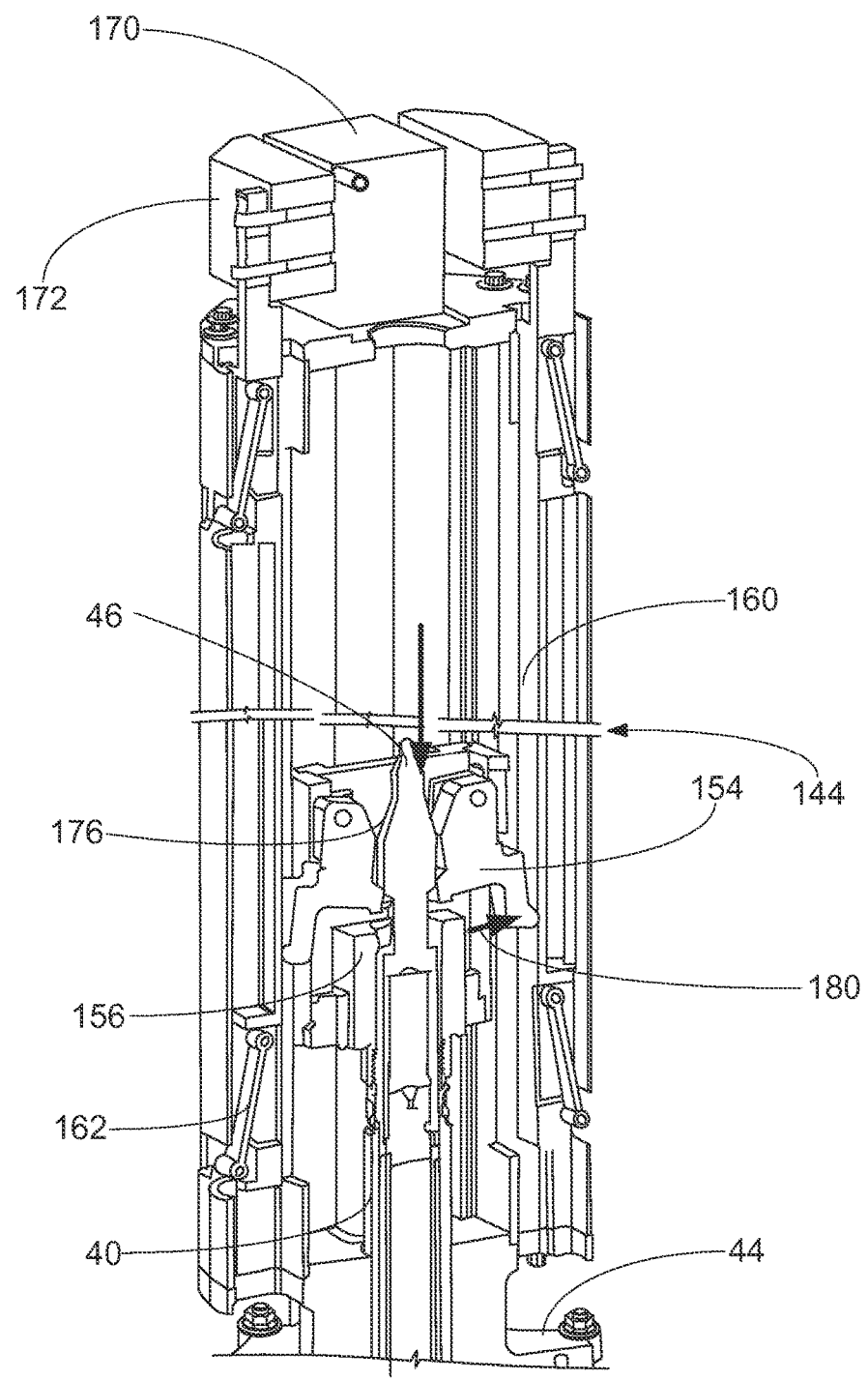

FIG. 11 shows the CRDM of FIGS. 7-18 at the start of SCRAM. The latches 154 have been rotated out of engagement by the downward force due to the weight of the translating assembly. The latch heels, which are in contact with the cam bars 160, push the cam bars outward thereby allowing the connecting rod to SCRAM. This action is designated by the force annotation 180 in FIG. 11. FIG. 11 shows the latches 154 in the land-on-land (LOL) position just riding over the outside diameter of the upper end of the connecting rod 46.

Figure 12B:
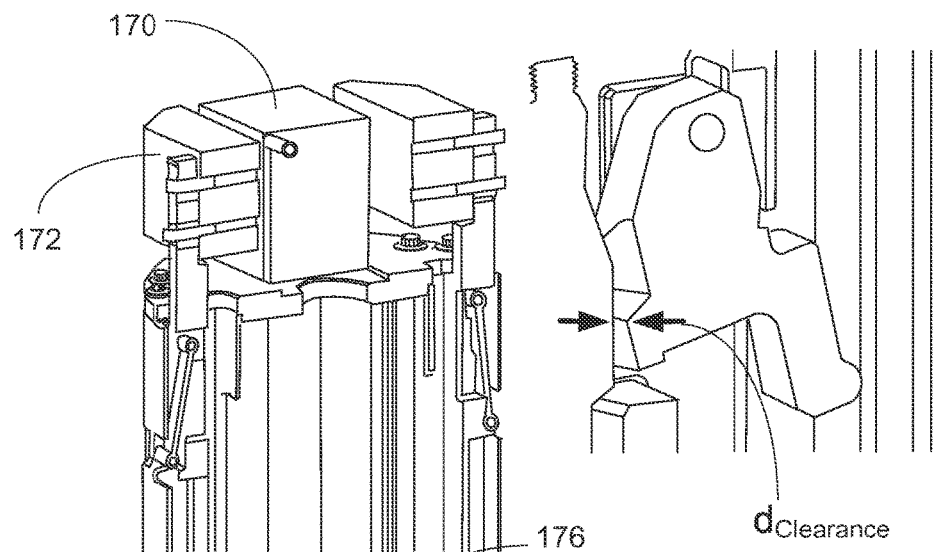
Figure 12A:
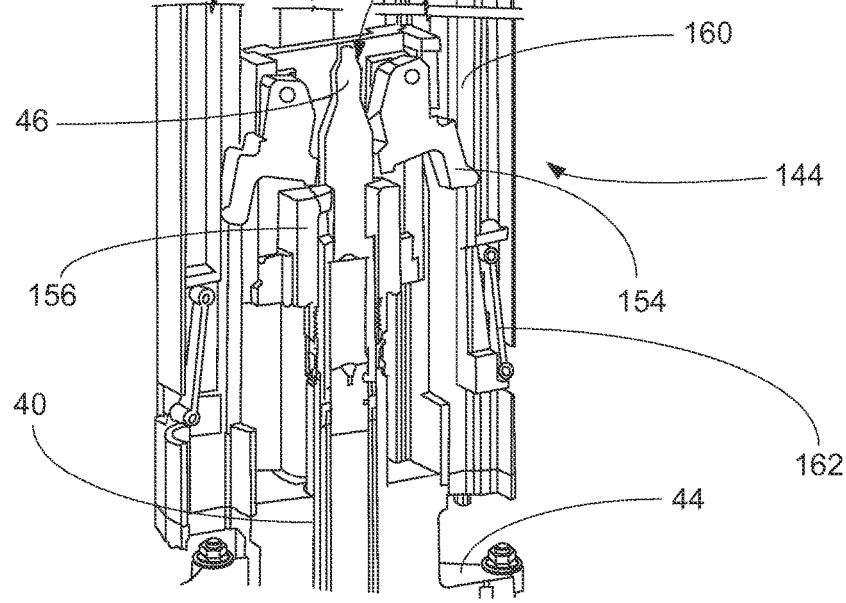

FIG. 12 illustrates the CRDM of FIGS. 7-18 with the latches 154 and cam bars 160 in the fully disengaged position. This orientation is a non-operational position that could occur if the latches 154 are "kicked" outward by the downward movement of the translating assembly during SCRAM. Although this is a non-operational position with the self-engaged cam bar design of FIGS. 7-18, it illustrates that there is ample clearance between the inside surface of the latches 154 and the connecting rod 46 for SCRAM reliability. This is shown in the inset of FIG. 12, where the clearance $d_{clearance}$ is indicated.

Figures 13A, 13B:
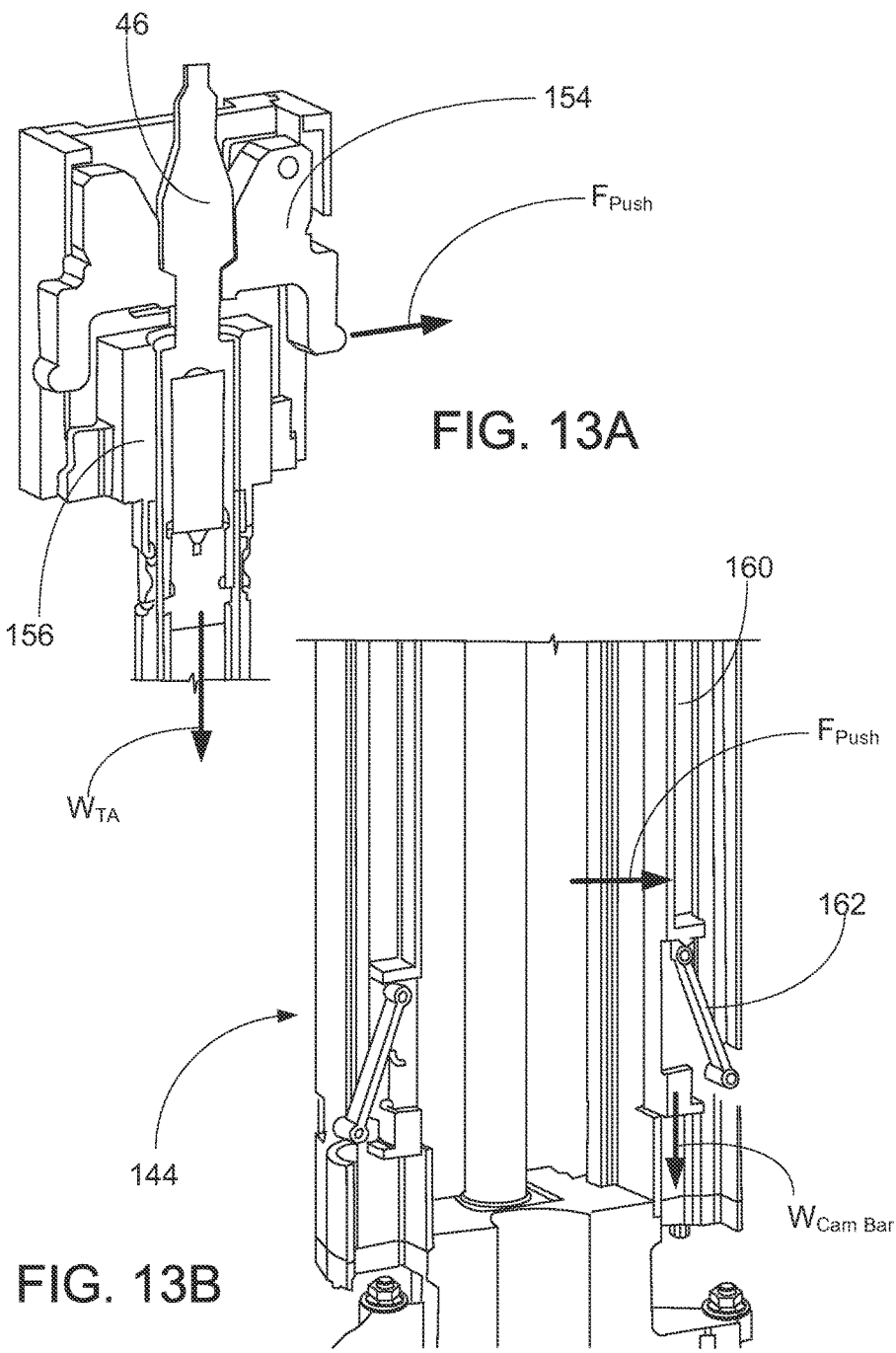

FIG. 13 illustrates the force balance for SCRAM operation. In FIG. 13, the weight of the translating assembly is denoted $W_{TA}$, the force pushing the cam bars outward is denoted $F_{push}$, and the weight of the cam bars is denoted $W_{Cam\ Bar}$. In the illustrative design, the maximum force needed to push each cam bar assembly outward for SCRAM (that is, the maximum required $F_{push}$) is only a few pounds. This lateral force component of the cam bar assembly weight $W_{Cam\ Bar}$ can be minimized by increasing the orientation angle of the cam link 162, e.g. to a minimum angle of about 70° in some calculated designs. In general, making the cam link 162 longer or at a larger angle (relative to the horizontal) reduces the maximum force needed to push out the cam bars. The minimum force available to push each cam bar 160 outward is produced by latch rotation due to the downward weight force of the translating assembly. This minimum available force is based on the translating assembly weight $W_{TA}$ minus worst-case assumed mechanical friction drag in the control rod channel and worst-case friction at all contact surfaces. SCRAM reliability is assured since the minimum available force $F_{push}$ for SCRAM is significantly larger than the force needed for SCRAM. Advantageously, the SCRAM is totally driven by gravity with no other loads required.

FIG. 14 illustrates the force balance for normal operation. Sufficient lateral force $F_{hold}$ must be applied at the heel of each latch 154 to hold the translating assembly weight $W_{TA}$ for various modes of operation. In the illustrative embodiment of FIGS. 7-18, this force is provided by the electromagnet holding system 150 at the top of the CRDM. Since the cam bars 160 are self-engaged, the cam bar side load reduces the needed electromagnetic force. The minimum holding force $F_{Mag}$ needed at the holding magnet 170 to maintain latch engagement during translation of the control rod assembly is computed based on translating assembly weight $W_{TA}$ plus worst-case assumed mechanical friction drag in the control rod channel. In calculated designs, there is ample holding force margin for all normal operating conditions.

Figure 15A:
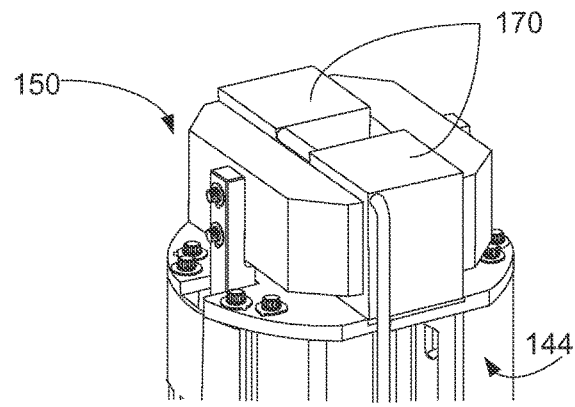
Figure 15B:
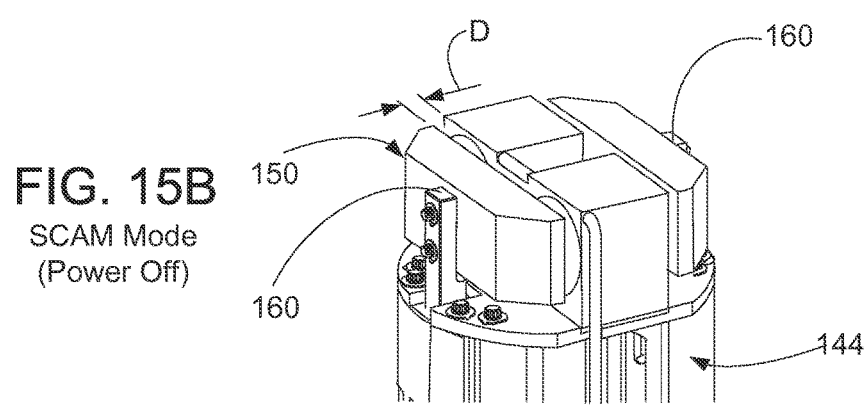
Figure 15C:
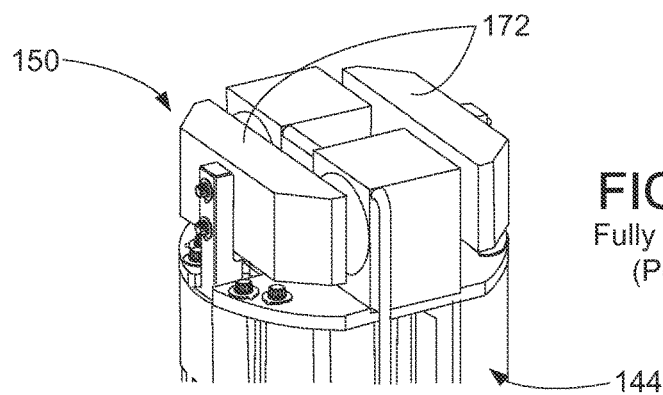

FIG. 15 illustrates isometric views of the electromagnet holding system 150 at the top of the CRDM. FIG. 15 shows the fully engaged operational configuration (top view, power to magnet 170 either on or off), the SCRAM operational configuration (middle view, power to magnet 170 off) and the fully disengaged operational configuration (bottom view, power to magnet 170 off). In the fully engaged mode (top view), either with or without electromagnet holding force, the magnetic couplers 172 are seated against the electromagnet housings 170. This seat provides the inward stop for the cam bars 160 and for the latches for full operational engagement.

Figure 16A:
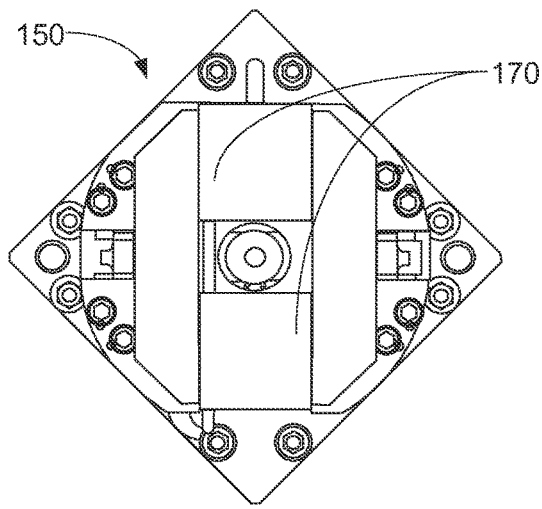
Figure 16B:
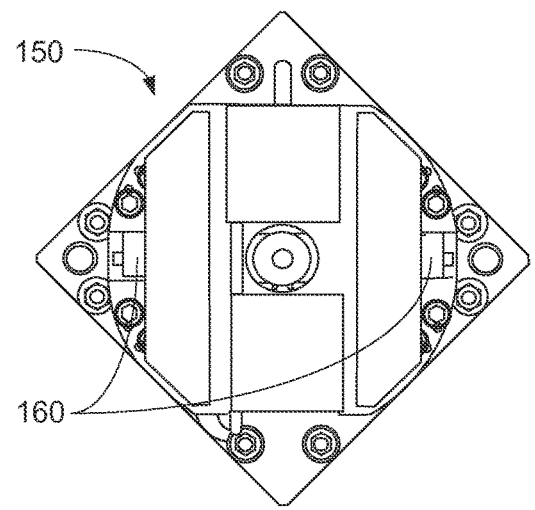
Figure 16C:
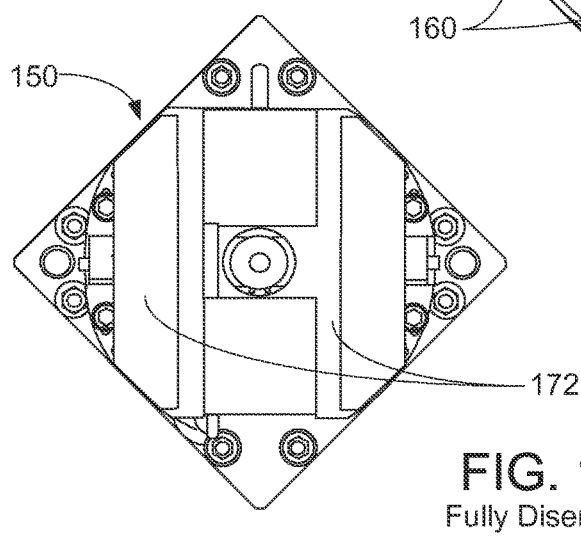
Figure 18B:
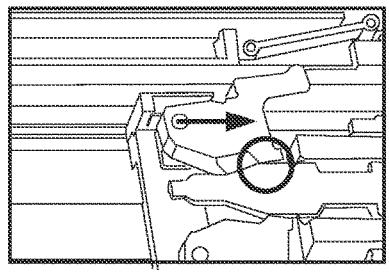
FIG. 18B illustrates latches at cam surface.
Figure 18E:
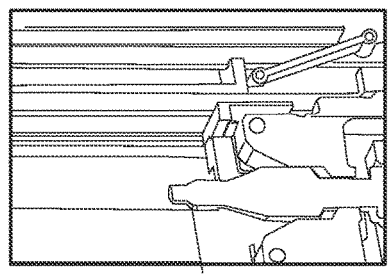
FIG. 18E illustrates latches reach pocket.
Figure 18A:
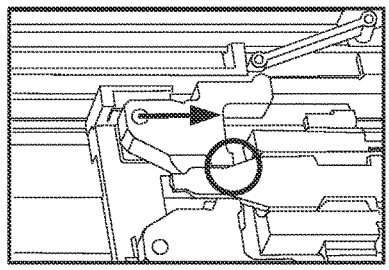
FIG. 18A illustrates a ball screw driving down.
Figure 18D:
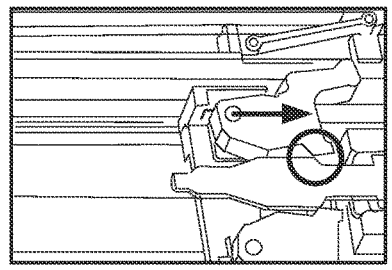
FIG. 18D illustrates ball screw continues down.
Figure 18C:
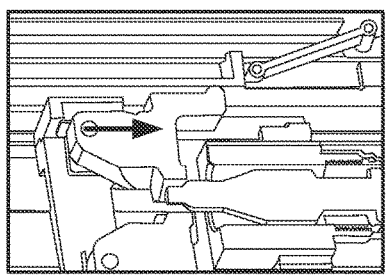
FIG. 18C illustrates latches on connecting rod OD.
Figure 18F:
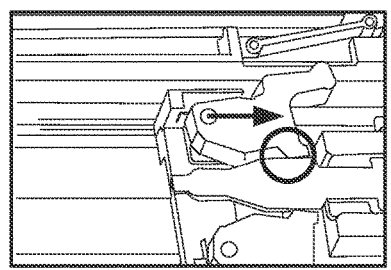
FIG. 18F illustrates latches full engaged.

FIG. 16 shows plan views corresponding to the isometric views of FIG. 15. It is seen from FIG. 16 that for all operating modes the electromagnet holding system 150 fits well within the CRDM space envelope.

FIG. 17 illustrates an enlarged cutaway view of the electromagnet holding system 150 for the fully engaged condition. The electromagnets 170 are suitably hermetically sealed by welding and potted for high temperature use inside the reactor pressure vessel. Some suitable materials for the components are as follows: for the electromagnet 170, the electromagnet housing may be alloy 625 non-magnetic material, the electromagnet core may be 410 stainless steel magnetic material, and the electromagnet winding may be 24 gauge copper wire; and the magnet couplers 172 may suitably be 410 stainless steel magnetic material. Designs with these materials are estimated to provide a calculated 310 lbs of holding force. These are merely illustrative examples, and other materials and/or design-basis holding force may be employed depending upon the reactor design.

FIG. 18 illustrates the latch re-engagement action. The views are labeled: (1) top left view; (2) top middle view; (3) top right view; (4) bottom left view; (5) bottom middle view; and (6) bottom right view. After a SCRAM event, when re-engagement is desired, the ball screw is driven back to the bottom by the CRDM motor. The latches 154 automatically re-engage with the lifting/connecting rod 46 as the latching assembly reaches bottom. For this purpose, a conical cam surface 176 is incorporated into the configuration of the upper end of the connecting rod 46. As the latch assembly is driven back down, the inboard surfaces of the latches 154 slide down over the top of the connecting rod 46, being cammed open by the conical cam surface 176 against the gravitational bias toward closure driven by the four-bar linkage, until the self-engaged latches 154 snap back into the normal engagement pocket. Normal operation can then resume.

The same latch auto re-engagement action, as illustrated in FIG. 18, can also be used to re-engage a control rod (or bank of control rods) that becomes stuck during SCRAM. The latch assembly is driven down over the upper end of the connecting rod 46 of the stuck rod (or rod bank) until the latches 154 snap into the normal engagement pocket. If it is desired to fully insert the rods into the reactor core (as is typically the case in the event of a SCRAM), then the latching assembly is driven downward by the ball screw and motor with the latches 154 pushing downward on the stuck rod. In that scenario, the bottom surfaces of the latches 154 contact the flat portion of the engaging pocket in the connecting rod 46. As load is applied, the eccentricity of the contact surfaces causes the latches 154 to remain engaged without any additional holding system. As the motor drives the ball screw down, the latches drive the stuck rod in.

With reference to FIGS. 19-22, another holding mechanism embodiment for a CRDM is described. In this regard, FIGS. 3-6 and 7-18 illustrate embodiments in which latch activation and long term hold/translation functions are separated, resulting in reduction of operational power requirements. FIGS. 3-6 illustrate an embodiment of the latch activation, while FIGS. 7-18 illustrate an embodiment of the latch activation (the self-engaging cam/latch system) in combination with an embodiment 150 of the long term hold/translation function. FIGS. 19-22 illustrate another embodiment of the long term hold/translation function, which may be used in combination with the embodiment of FIGS. 3-6 or substituted for the holding mechanism 150 of the embodiment of FIGS. 7-18.

Figure 20:
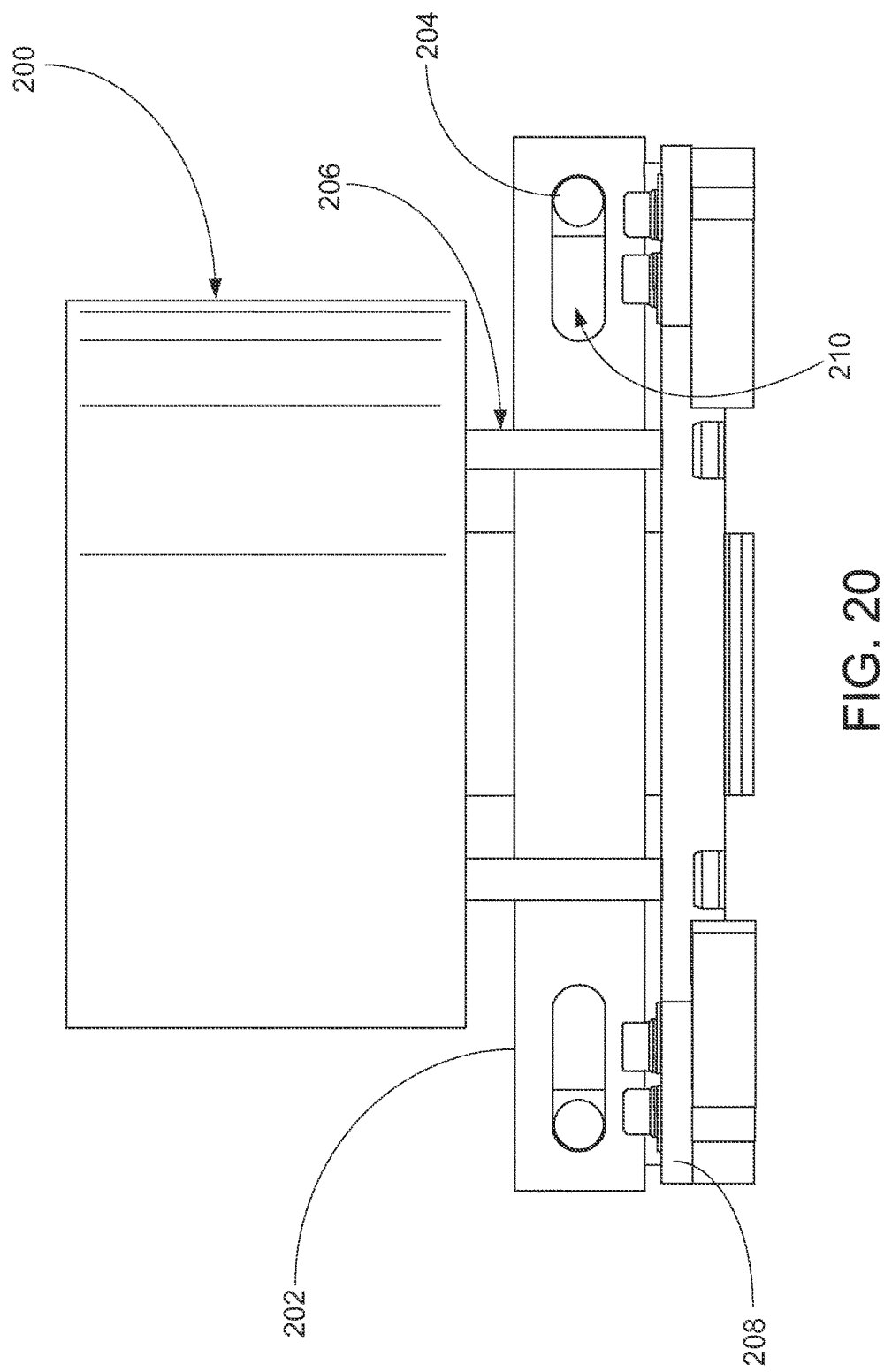
Figure 21:
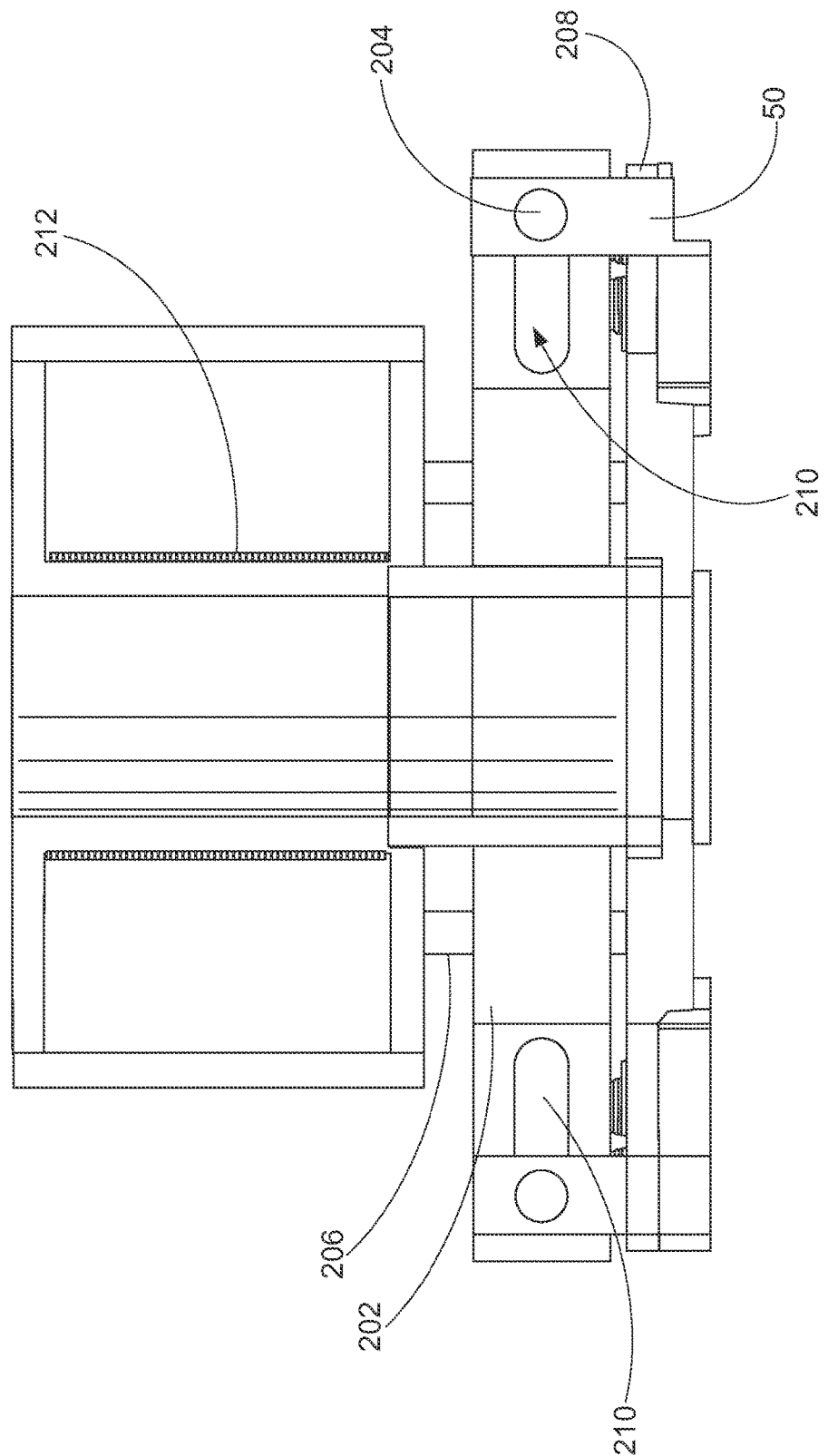
Figure 22:
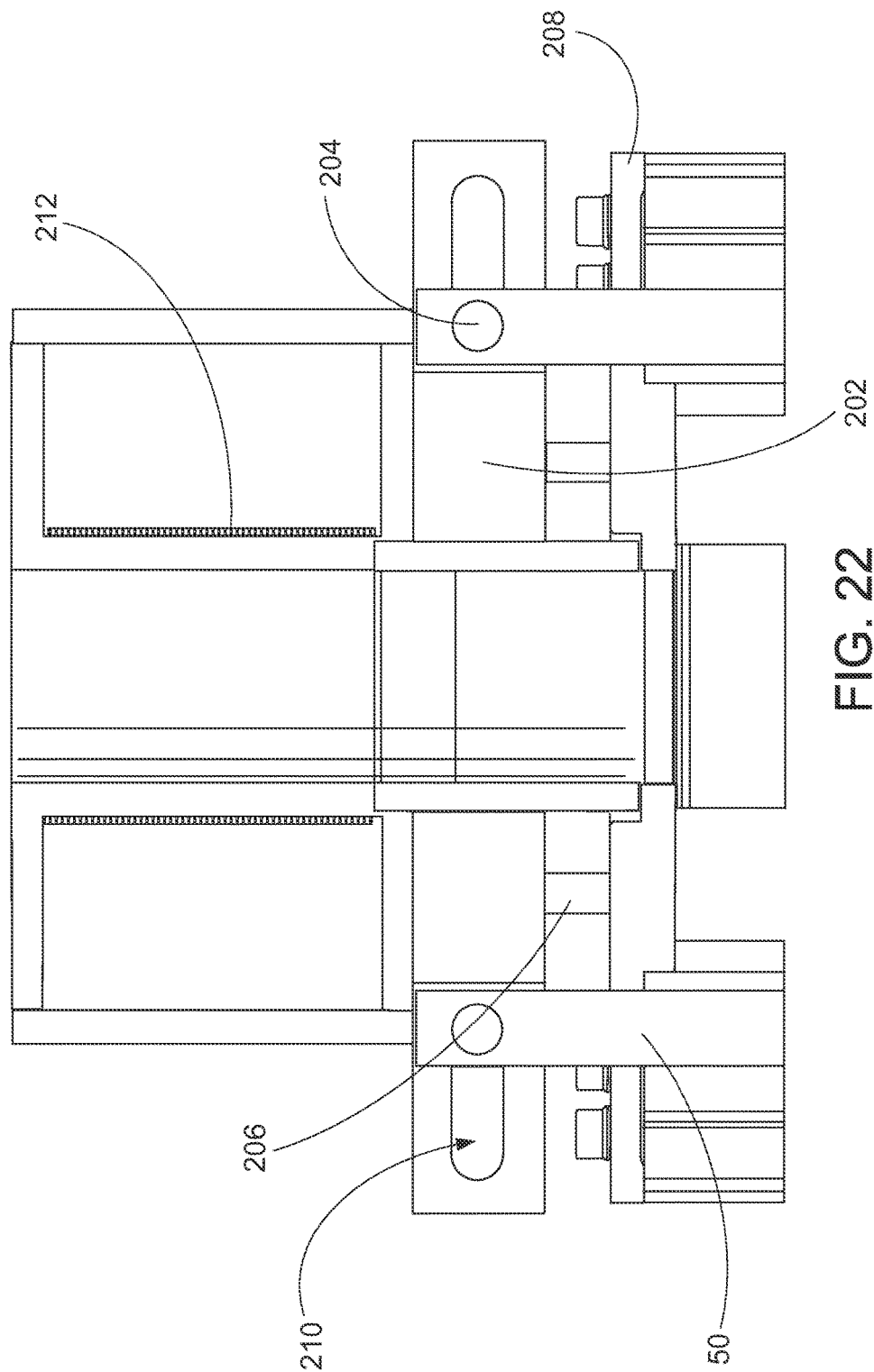

FIG. 19 shows an isometric view of the latch hold mechanism of FIGS. 19-22 operating in conjunction with the cam assembly of FIGS. 2-6, i.e. with cam bars 50. FIGS. 20 and 21 show side view and cutaway side views, respectively, of the latch hold mechanism in its disengaged position. FIG. 22 shows a side cutaway view of the latch hold mechanism in its engaged position. The holding mechanism illustrated in FIGS. 19-22 utilizes a large electromagnet 200, coupled with a magnetic hanger 202 connected with the upper ends of the cam bars 50 by pins 204, as shown in FIG. 19. The electromagnet 200 is spaced apart from the hanger 202 by support posts 206 extending from a base plate 208 secured to (or forming) the top of the cam bar assembly 144. With the CRDM engaged by an engagement mechanism (such as that described with reference to FIGS. 3-6, in illustrative FIGS. 19-22), the electromagnet 200 is activated, causing a magnetic attraction between the hanger 202 and the electromagnet 200 that holds the hanger 202 in contact with the electromagnet 200 as shown in FIG. 22 (or, in alternative embodiments, into contact with a landing surface interposed between the electromagnet and the hanger). The raised hanger bar 202 holds the cam bars 50 in their raised (i.e. engaged) position via the pins 204. When power is cut to the electromagnet 200 the attractive force between the magnet 200 and the hanger 202 is severed, causing the hanger 200 and cam bars 50 to fall to the disengaged position shown in FIGS. 20 and 21. Pin slots 210 in the hanger 202 accommodate the lateral motion of the cam bars 50 due to the four-bar linkage. The sectional views of FIGS. 21 and 22 illustrate the copper windings 212 of the electromagnet 200.

By separating latch activation and long term hold/translation functions of the latch of the CRDM, it is recognized herein that the operational power requirements can be reduced, since the holding mechanism is not required to actually lift the cam bars, but merely maintains the cam bars in the lifted position after the (different) engagement mechanism operates. The separation of features simplifies the holding feature making it easier to manufacture and less expensive.

Figure 23:
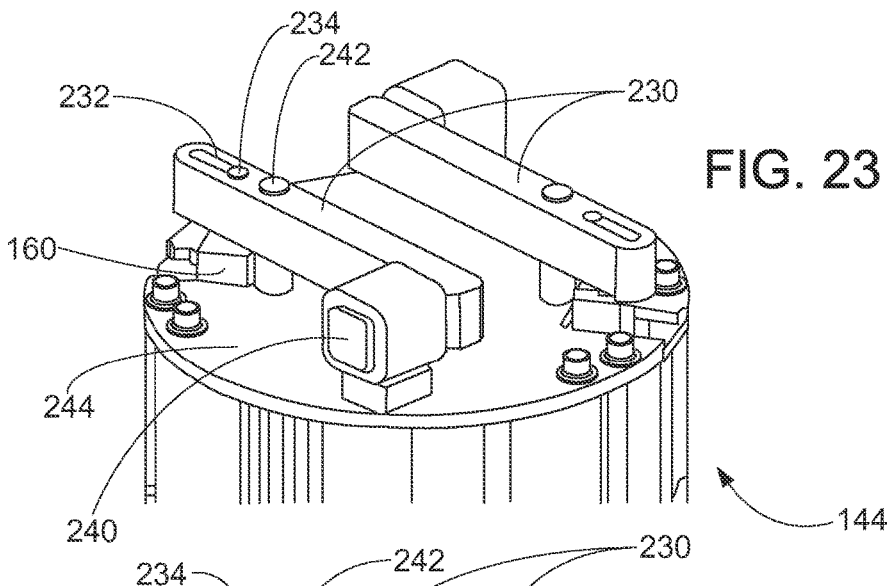
FIGS. 23-32 diagrammatically show aspects of another illustrative holding mechanism suitably used in, for example, the CRDM of FIGS. 3-6 or the CRDM of FIGS. 7-18.
Figure 24:
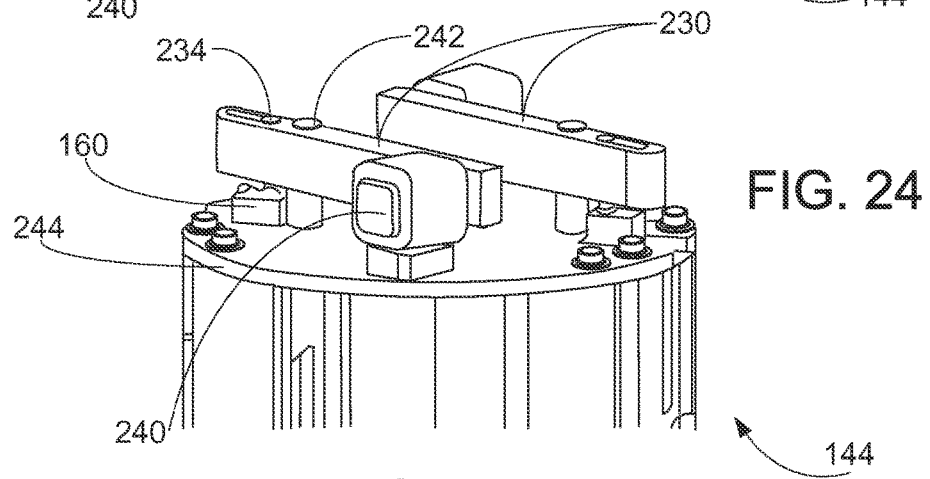
Figure 25:
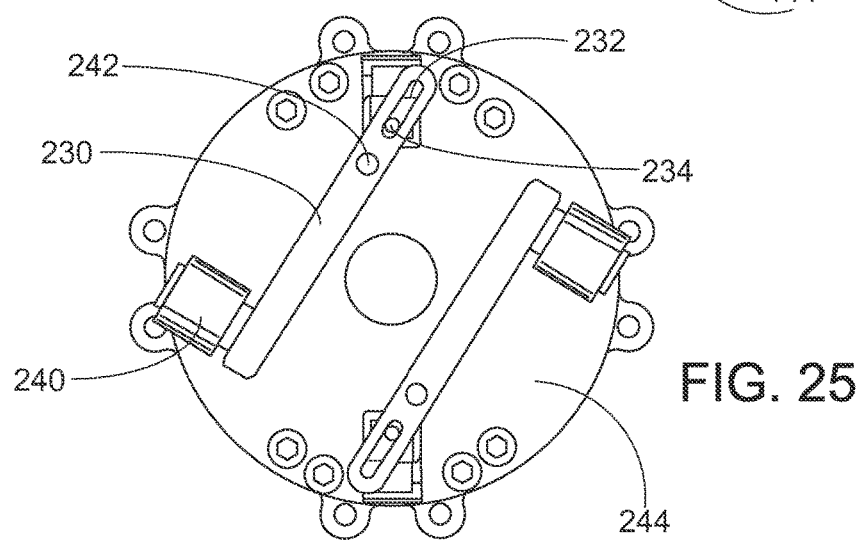
Figure 26:
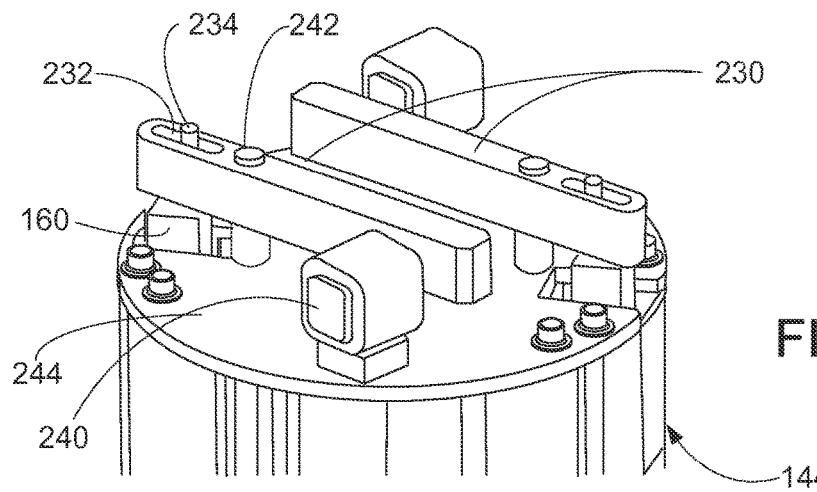
Figure 27:
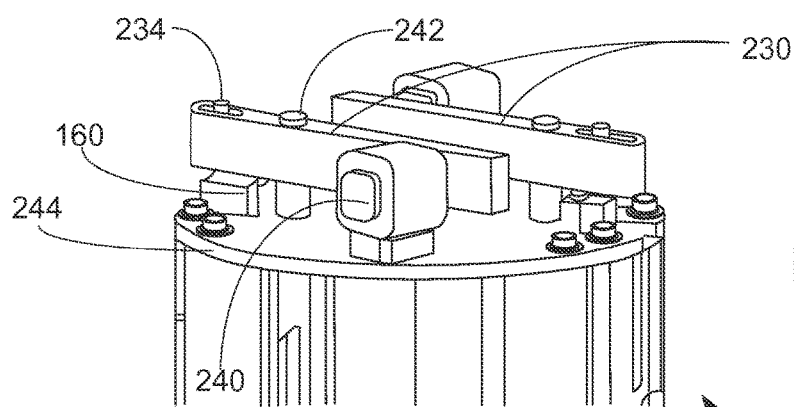
Figure 28:
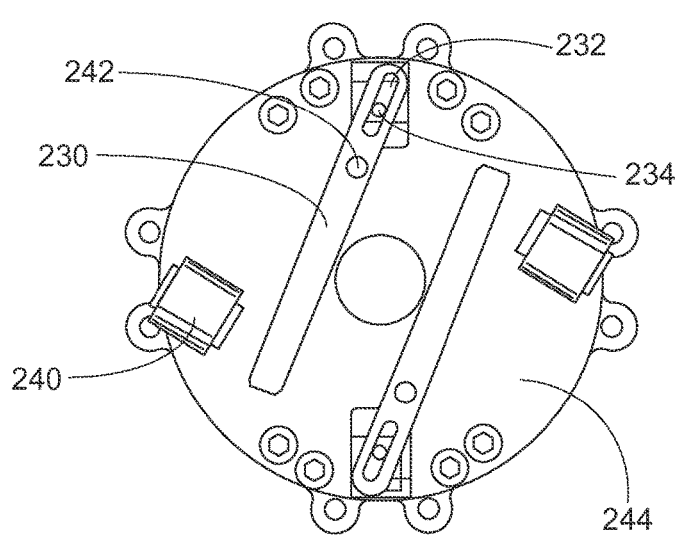
Figure 29:
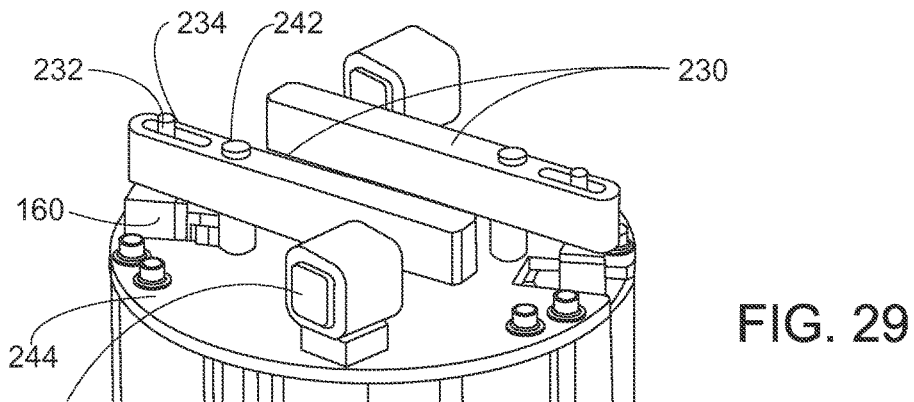
Figure 30:
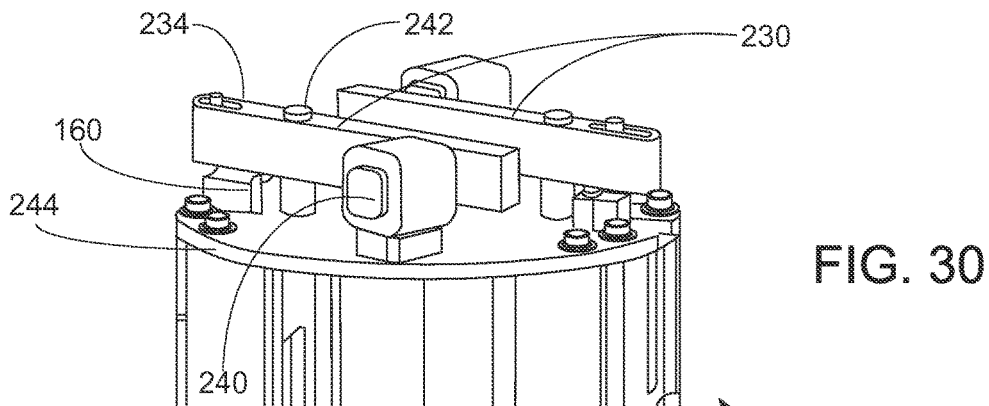
Figure 31:
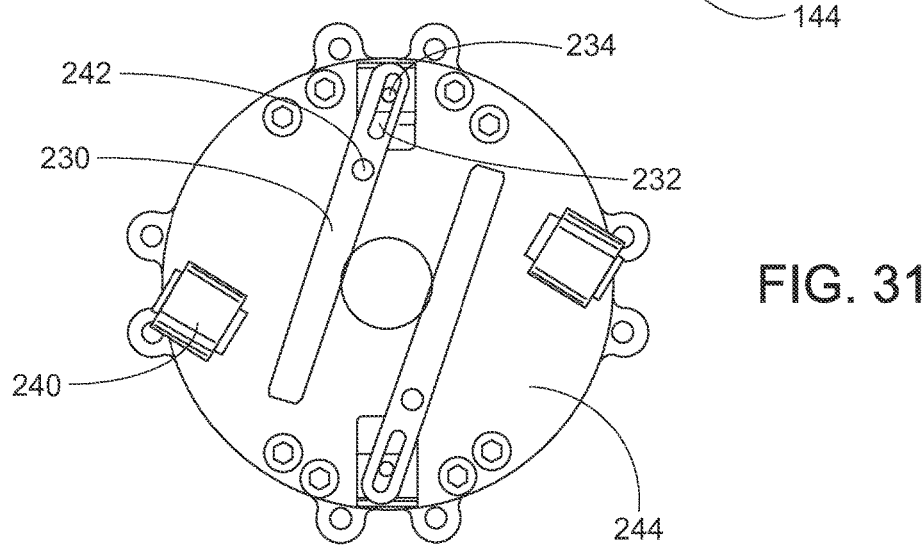

With reference to FIGS. 23-32, another holding mechanism embodiment for a CRDM is described, which may be used in combination with the embodiment of FIGS. 3-6 or substituted for the holding mechanism 150 of the embodiment of FIGS. 7-18. FIGS. 23-25 show two isometric views and a plan view, respectively, of the holding mechanism in the fully engaged position. FIGS. 26-28 show two isometric views and a plan view, respectively, of the holding mechanism in the SCRAM position. FIGS. 29-31 show two isometric views and a plan view, respectively, of the holding mechanism in the fully disengaged position. The isometric view of FIGS. 23, 26, and 29 show the top region of the CRDM including the holding mechanism at a viewing angle of approximately 45°. The isometric view of FIGS. 24, 27, and 30 show the top region of the CRDM including the holding mechanism at a more oblique viewing angle than 45°.

Figure 32:
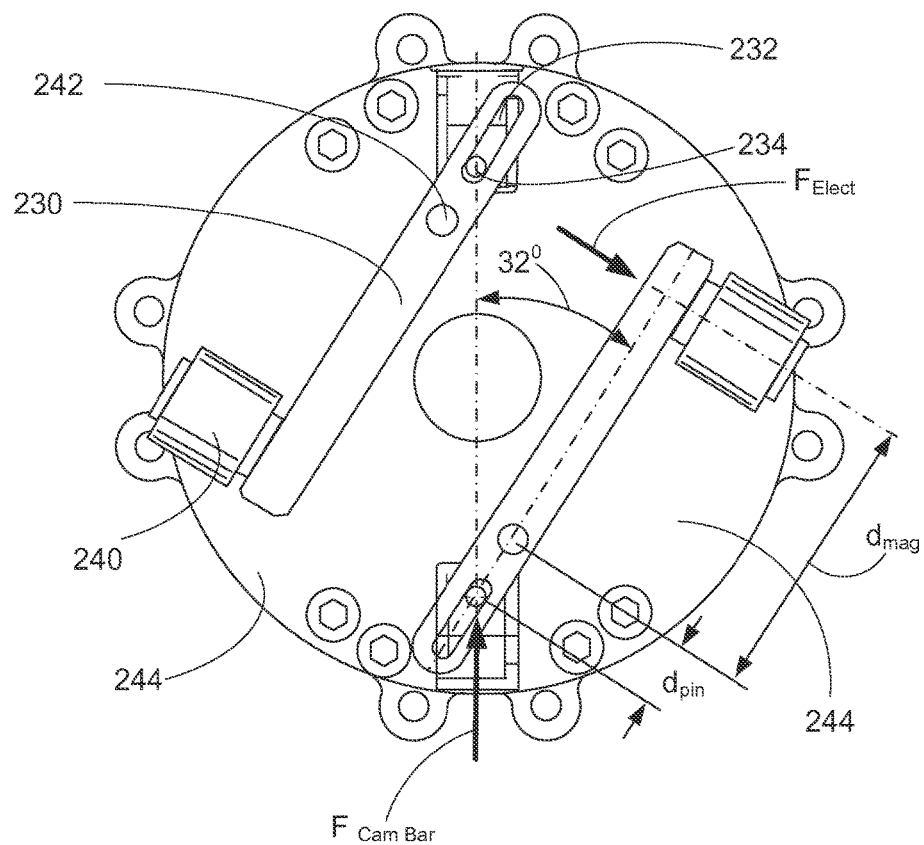

FIG. 32 illustrates a plan view of the holding mechanism with annotations of the electromagnet holding force $F_{Elect}$ for applying a force $F_{Cam\ Bar}$ sufficient to hold the cam bars 160.

The holding mechanism of FIGS. 19-28 utilizes horizontal holding arms 230 that have slots 232 into which pins 234 at the tops of the cam bars 160 (e.g. cam bar pins 234) fit. When the cam bars 160 are moved to the engaged position by an engagement mechanism (e.g. such as the one described with reference to FIGS. 3-6, or the self-engaging cam/latch system of the embodiment of FIGS. 7-18), the cam bar pin 234 in each pin slot 232 pushes the holding arm 230 to rotate to a point where it is in close proximity with an electromagnet 240. The rotation is about an arm pivot point 242, and the various components of the holding mechanism are mounted on a baseplate 244 that is secured to (or forms) the top of the cam bar assembly 144. When power is applied to the electromagnets 240 they attract and hold the arms 230 which are made of magnetic material. The restrained arms, in turn, hold the cam bars 160 in the engaged position via the cam bar pins 234 in the pin slots 232 and thereby maintain latch engagement. FIGS. 23-25 shows two alternative isometric views and a top view, respectively, of the holding mechanism in this fully engaged position.

With reference to FIGS. 26-28 (SCRAM mode) and FIGS. 29-31 (fully disengaged mode), when power is cut to the electromagnets 240, the attractive force between the electromagnets 240 and the arms 230 is severed, allowing the arms 230 to rotate out of engagement. The weight of the translating assembly is sufficient to disengage the latches and move the cam bars 160 away (i.e. outward) for SCRAM. During this action, the holding arms 230 freely move out of the way.

With particular reference to FIG. 32, the holding mechanism of FIGS. 23-32 provides a mechanical advantage due to the configuration of the holding arms 230. This is accomplished by the relative positions of the arm pivot point 242, the cam bar contact point (i.e. the engagement between the cam bar pin 234 and the pin slot 232) and the electromagnet holding force contact point (corresponding to the location of the electromagnet 240), suitably quantified by the distance $d_{mag}$ between the magnet 240 and the pivot point 242 and the distance $d_{pin}$ between the cam bar contact point (approximately the cam bar pin 234) and the pivot point 242. Because of this mechanical advantage, the holding force $F_{Elect}$ provided by the electromagnets 240 can be reduced to provide a given force $F_{Cam\ Bar}$ for holding the cam bars 160. This facilitates the use of smaller, less complex electromagnets as the electromagnets 240, as well as lower power demands for operation.

The configuration of the electromagnetic holding mechanism of FIGS. 23-32 will vary somewhat depending on the configuration of the cam bars 160 and the four bar linkage. The pin slot 232 is arranged to accommodate the horizontal cam bar travel while providing the appropriate engagement to rotate the horizontal holding arms 230.

In a variant embodiment, magnets are embedded into the holding arms to provide added holding strength. In some embodiments, this added force is expected to be enough to enable the holding mechanism of FIGS. 23-32 to perform both the engagement and holding operations, and could, for example, be used in place of the hydraulic lifting assembly 56 of the embodiment of FIG. 2.

By way of review, FIGS. 23-25 show the cam bars 160 and holding arms 230 in the fully engaged position, either held by the electromagnets 240 or engaged by an outside means (e.g. such as the one described with reference to FIGS. 3-6, or the self-engaging cam/latch system of the embodiment of FIGS. 7-18) prior to powering the electromagnets 240. FIGS. 26-28 show the SCRAM mode, in which the arms 230 and thus the cam bars 160 have moved sufficiently for the latches to completely release the connecting (i.e. lifting) rod and control rod assembly. FIGS. 29-31 show the fully disengaged position. Due to the 4-bar linkage action, the cam bars 160 rise and fall as they are moved laterally from engaged to disengaged positions. This action is best seen in the isometric view of FIGS. 24, 27, and 30. Since the holding arms 230 pivot about fixed support posts (the pivot arm points 242), the pin slots 232 are incorporated into the holding arms 230 to accommodate the rise and fall of the cam bars 160. These slots 232 should be sized and positioned to accommodate both the rise and fall of the cam bars 160 and the lateral motion of the cam bars 160 due the four-bar linkage action responding to the rise/fall of the cam bars 160.

When used in conjunction with the self-engaging cam/latch system described herein with reference to FIGS. 7-18, the direct mechanical advantage for the illustrated locations of the holding arm pivot points 242 has been estimated to be approximately 4.5:1 (corresponding to the ratio $d_{mag}/d_{pin}$ in FIG. 32). However, there is not a direct relationship between this mechanical advantage and the holding force needed since the holding arms 230 do not pull in line with the plane of collapse of the cam bars 160. A force correction is needed that is proportional to the cosine of the holding arm angle. The net effect for the configuration shown herein is an effective mechanical advantage of 2.4:1. This force balance, along with the effective mechanical advantage, is diagrammatically illustrated in FIG. 32. The holding mechanism of FIGS. 23-32 has the benefit of a mechanical advantage provided by the configuration of the holding arms.

Figure 33:
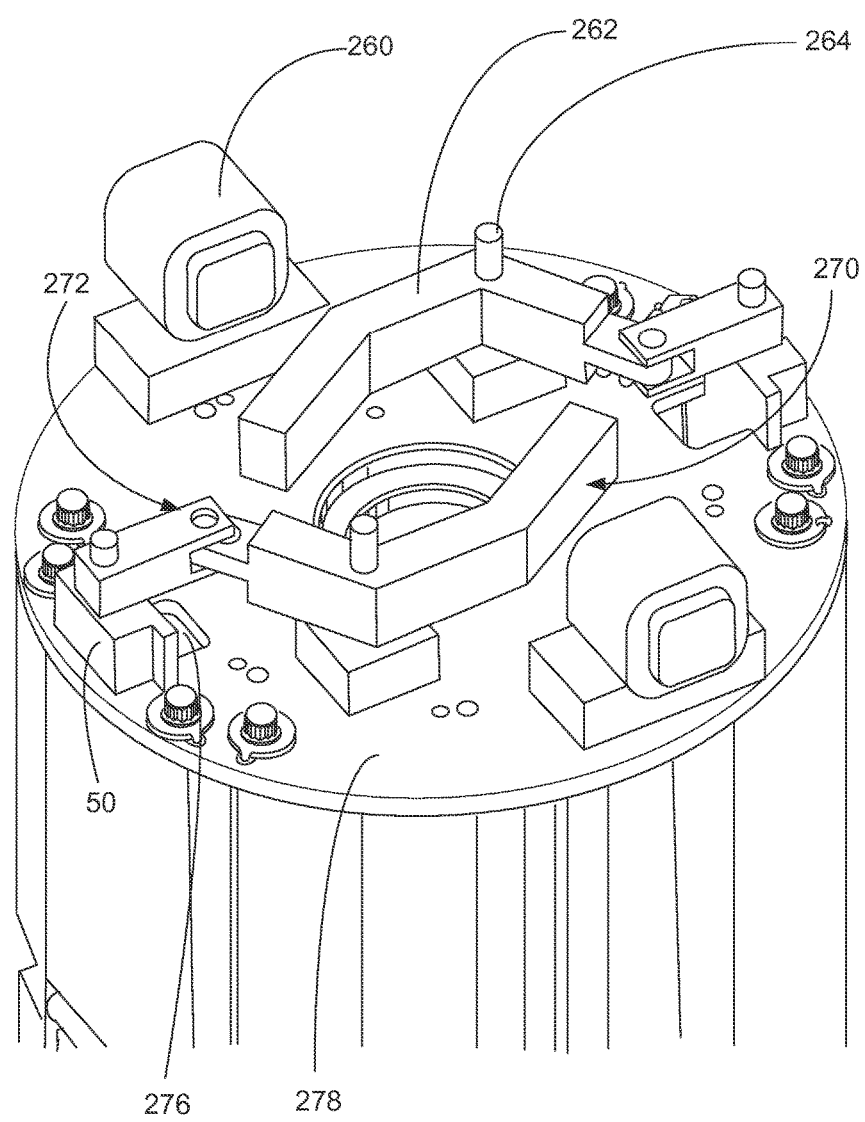
FIGS. 33-38 diagrammatically show aspects of another illustrative holding mechanism suitably used in, for example, the CRDM of FIGS. 3-6 or the CRDM of FIGS. 7-18.
Figure 34:
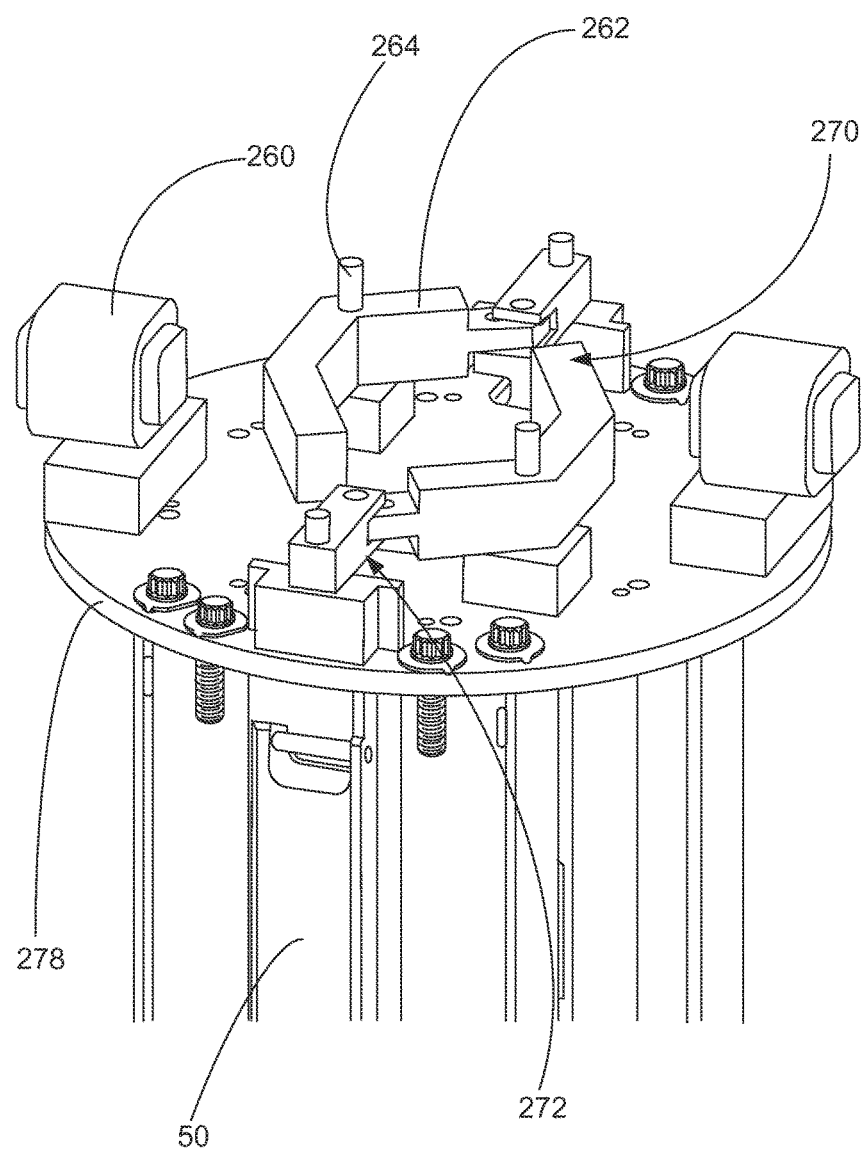
Figure 35:
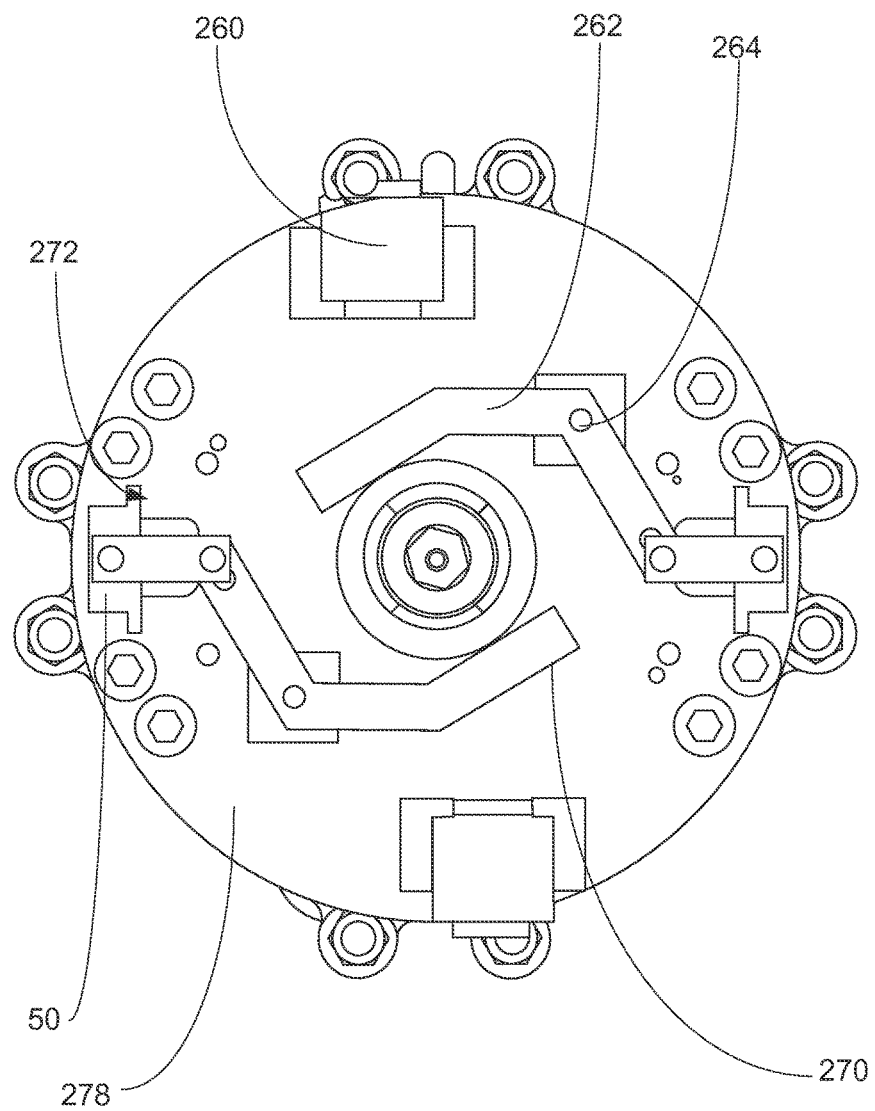
Figure 36:
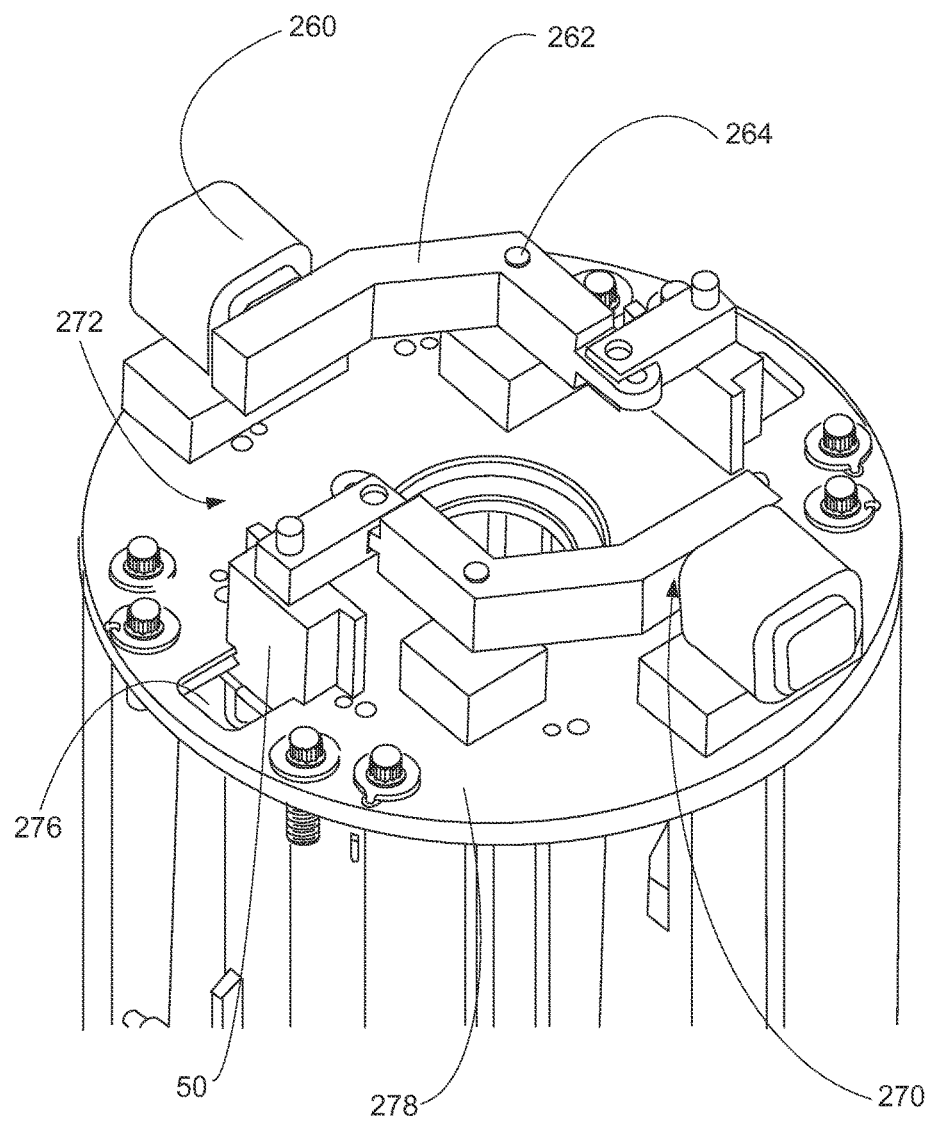
Figure 37:
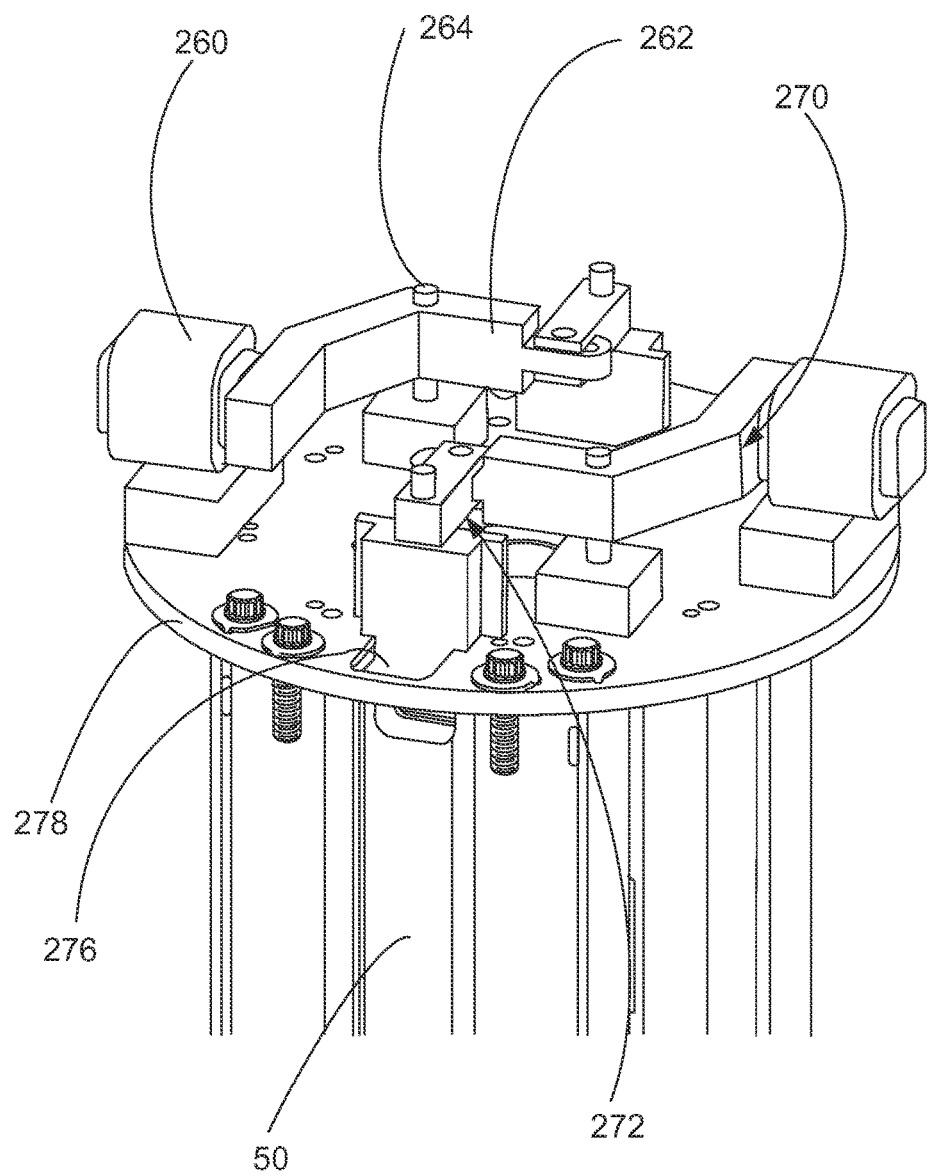
Figure 38:
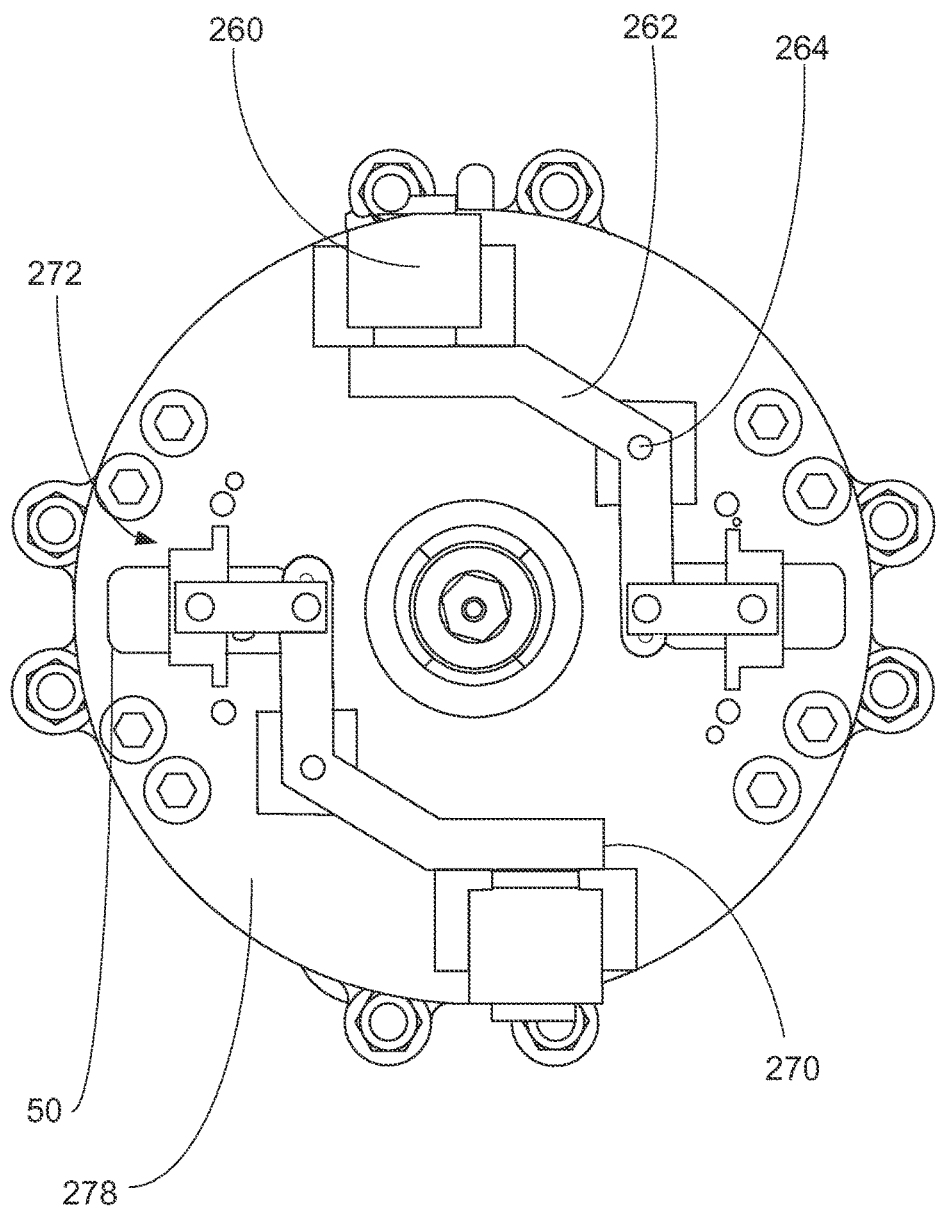

With reference to FIGS. 33-38, another holding mechanism embodiment for a CRDM is described, which may be used in combination with the embodiment of FIGS. 3-6 or substituted for the holding mechanism 150 of the embodiment of FIGS. 7-18. FIGS. 33-35 show two isometric views at different viewing angles and a top view, respectively, of the top of the CRDM (and more particularly the top of the cam assembly and the holding mechanism) with the cam system in the unlatched position. FIGS. 36-38 show two isometric views at different viewing angles and a top view, respectively, of the top of the CRDM including the holding mechanism with the cam system in the latched position. Illustrative FIGS. 33-38 show the holding mechanism in combination with the embodiment of FIGS. 3-6, and hence the cam bars are labeled cam bars 50 in FIGS. 33-38.

Once the cam system is in the engaged (i.e. "latched") position the holding mechanism of FIGS. 33-38 holds the cam bars 50 such that they engage the latches and maintain latching of the connecting (i.e. lifting) rod. The holding mechanism of FIGS. 33-38 includes two high temperature magnets 260 and magnetic links 262 attached to the upper end of each of the two cam bars 50 at the top end of the CRDM. The two canned high temperature electromagnets are suitably wired in a parallel fashion.

When the cam system transitions from the unlatched position (FIGS. 33-35) to the engaged (latched) position (FIGS. 36-38), the upper ends of the cam bars 50 engaging the magnetic links 262 rotate the magnetic links 262 about pivots 264 so that the ends 270 of the magnetic links 262 distal from the cam bar/magnetic link joint 272 are moved by the inward movement of the cam bars 50 to be in close proximity to the electromagnets 260. When the electromagnets 260 are energized these distal ends 270 of the magnetic links 262 are held against the magnets 270, and the cam bar 50 at the opposite end of the link 262 is prevented from moving. This holds the latch in the latched position. The holding power of the electromagnets 260 is adequate to hold the weight of the cam bars 50 as well as the force exerted on the cam bars 50 by the latches. The latched state is shown in alternative isometric views (FIGS. 36 and 37) and a plan view (FIG. 38). Slots 276 in a base plate 278 secured to (or forming) the top of the cam bar assembly and supporting the hold mechanism components accommodate the lateral motion of the cam bars 50 during unlatched/latched transitions.

When used in conjunction with the embodiment of FIGS. 3-6 (as illustrated in FIGS. 33-38), operation is as follows. When the electromagnets 260 are de-energized the magnetic links 262 are decoupled from the electromagnets 260 and the cam bars 50 are free to fall under their own weight and swing into the unlatched position. In the unlatched position the cam bars 50 are disengaged from the latches and the latches can then rotate out of engagement with the connecting rod. When the cam bars 50 are disengaged from the latches, the latches can be rotated out of engagement with the connecting rod by the latch springs 106 (for the embodiment of FIGS. 3-6). Therefore, in the unlatched position the cam bars 50 are not engaged with the latches, the latches are not engaged with the lifting rod and the translating assembly (including the lifting rod and the attached control rod or rods) can then fall under its own weight (SCRAM). The holding mechanism of FIGS. 33-38 is fail-safe in the sense that if power is lost to the electromagnets 260 the connecting rod will SCRAM due to gravity.

Operation of the holding mechanism of FIGS. 33-38 in conjunction with the cam arrangement of FIGS. 7-18 (self-latching) is similar, except that when the electromagnets 260 are de-energized the cam bars 160 do not open under gravity, but rather are cammed open by the cam surface at the upper end of the lifting rod 46 of the falling translating assembly. (See description of FIGS. 7-18 for details). Again, the de-energizing of the electromagnets 260 allows the magnetic links 262, and hence the cam bars 160, to freely move to perform the SCRAM.

With reference to FIGS. 39-48, another holding mechanism embodiment for a CRDM is described, which may be used in combination with the embodiment of FIGS. 3-6 or substituted for the holding mechanism 150 of the embodiment of FIGS. 7-18. The embodiment of FIGS. 39-48 is illustrated in conjunction with a four-bar linkage with cam bars and cam bar links oriented as in the embodiments of FIGS. 2-6; accordingly, in FIGS. 39-48 the cam bars and cam bar links are labeled as cam bars 50 and cam bar links 52, respectively.

The embodiment of FIGS. 39-48 illustrates a variant latching mechanism located beneath the cam assembly, in which a hydraulic cylinder 300 (or, alternatively, an electric solenoid) raises a lift plunger or piston 302 upward to engage cam bar lift rollers 304 at the bottom ends of the cam bars 50 so as to raise the cam bars 50—by action of the four-bar linkage provided by cam bar links 52 this raising of the cam bars 50 simultaneously moves the cam bars 50 inward to engage the latch. (By comparison, in the embodiment described with reference to FIG. 2, the hydraulic lift assembly 56 located above the cam assembly lifts the upper ends of the cam bars 50 to engage the latches). The embodiment of FIGS. 39-48 also illustrates a holding mechanism located above the cam assembly, where a base plate 308 secured to (or forming) the top of the cam bar assembly supports the hold mechanism components.

Figure 39:
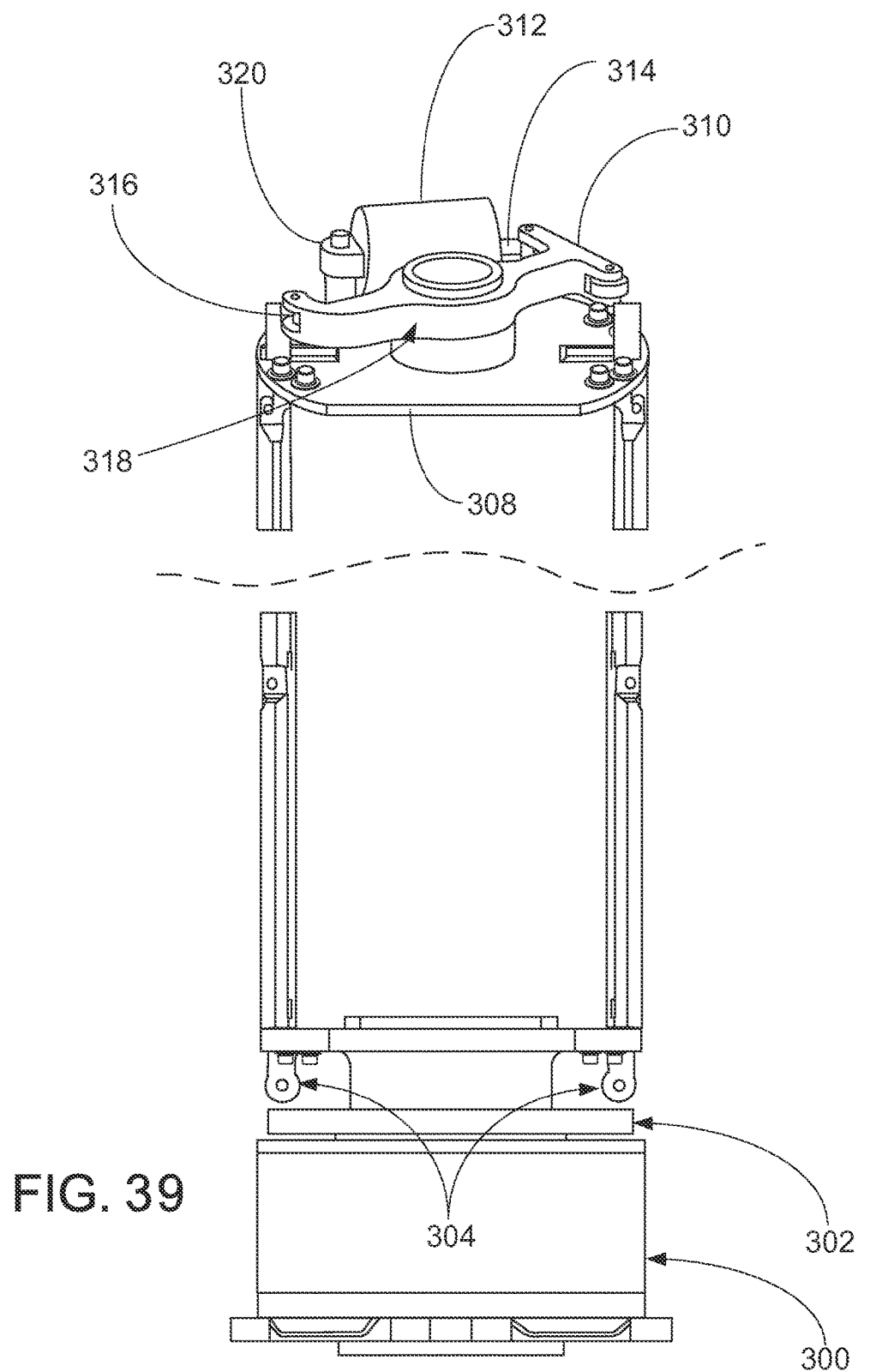
Figure 40:
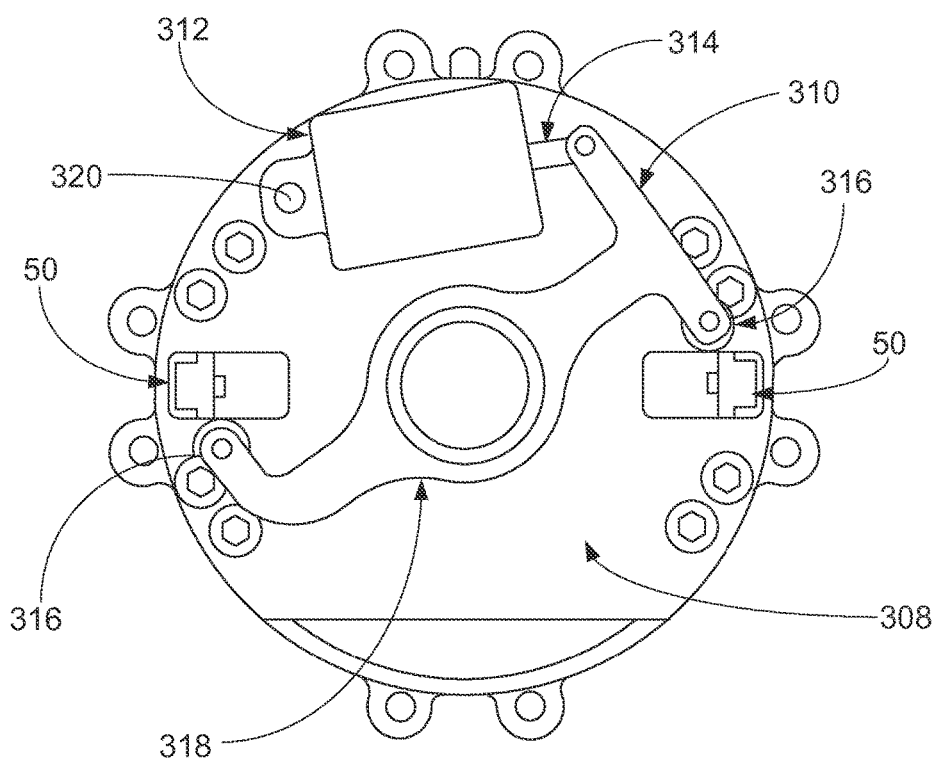
Figure 41:
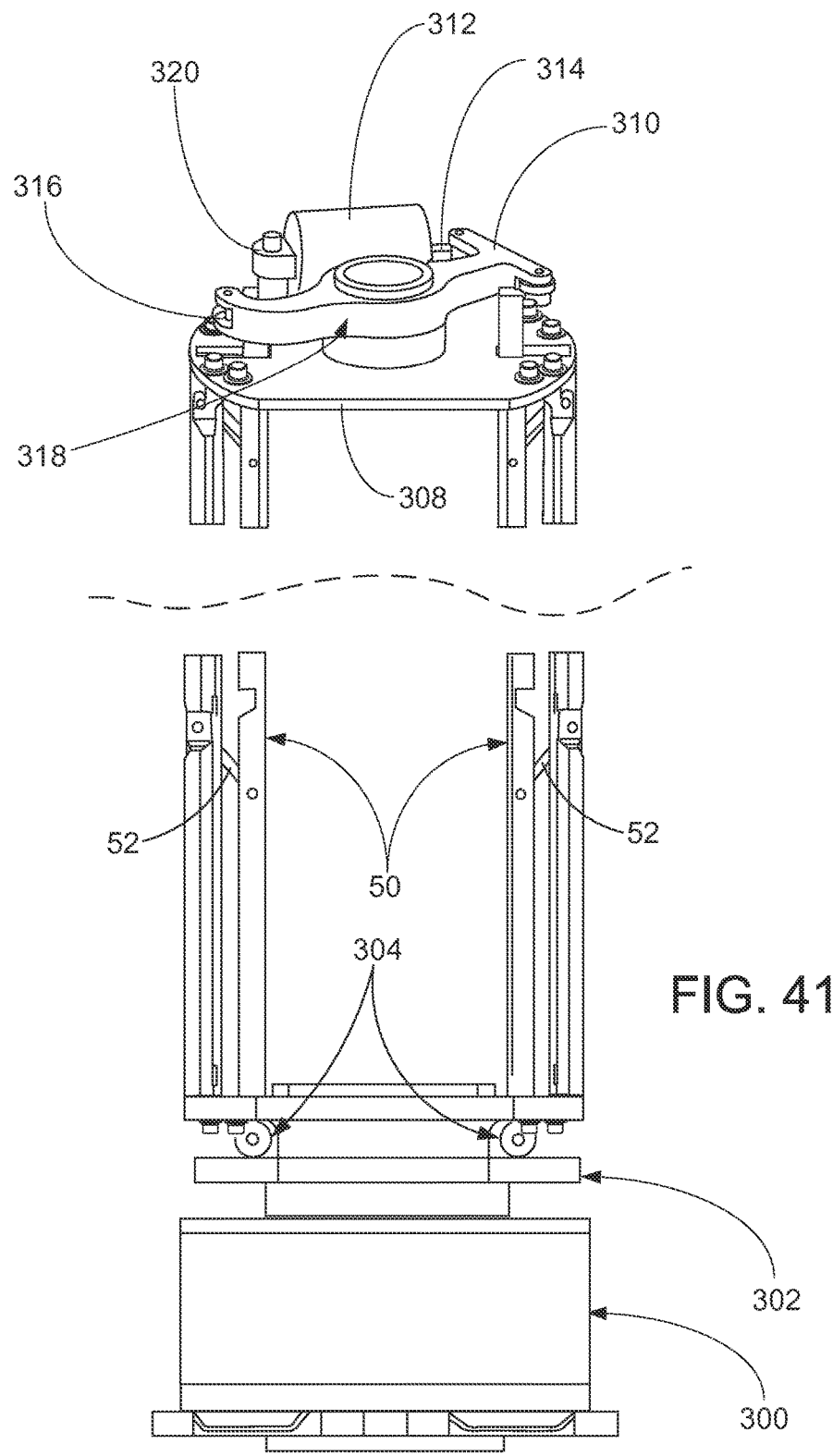
Figure 42:
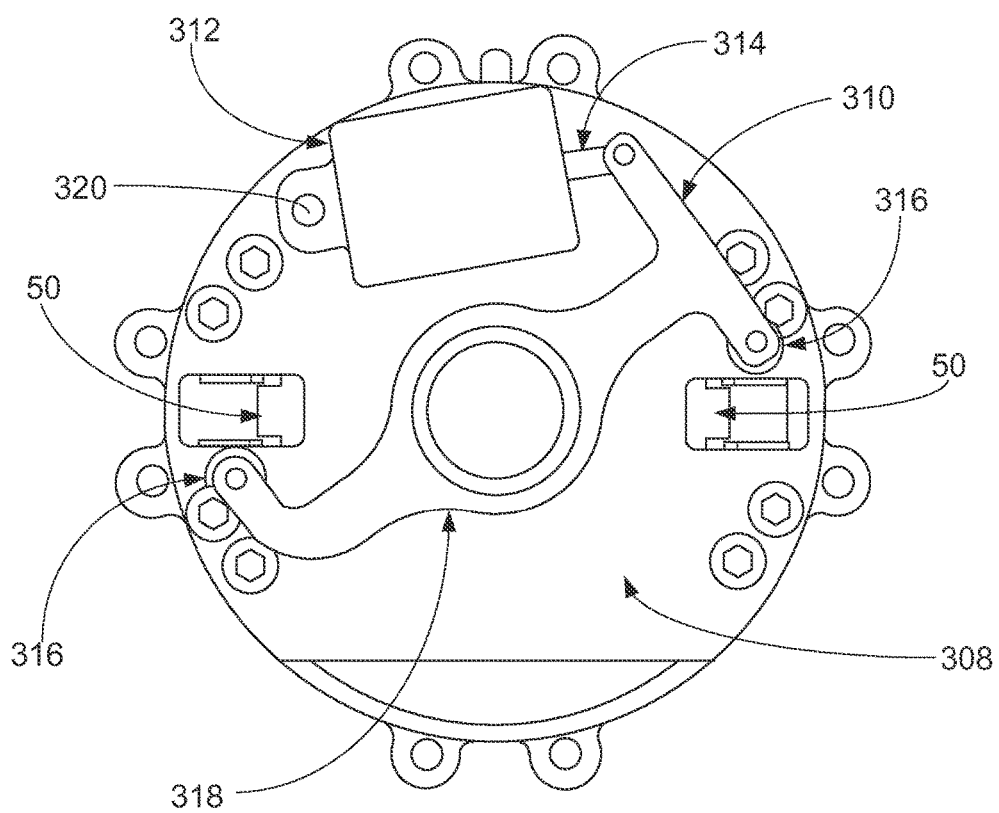
Figure 44:
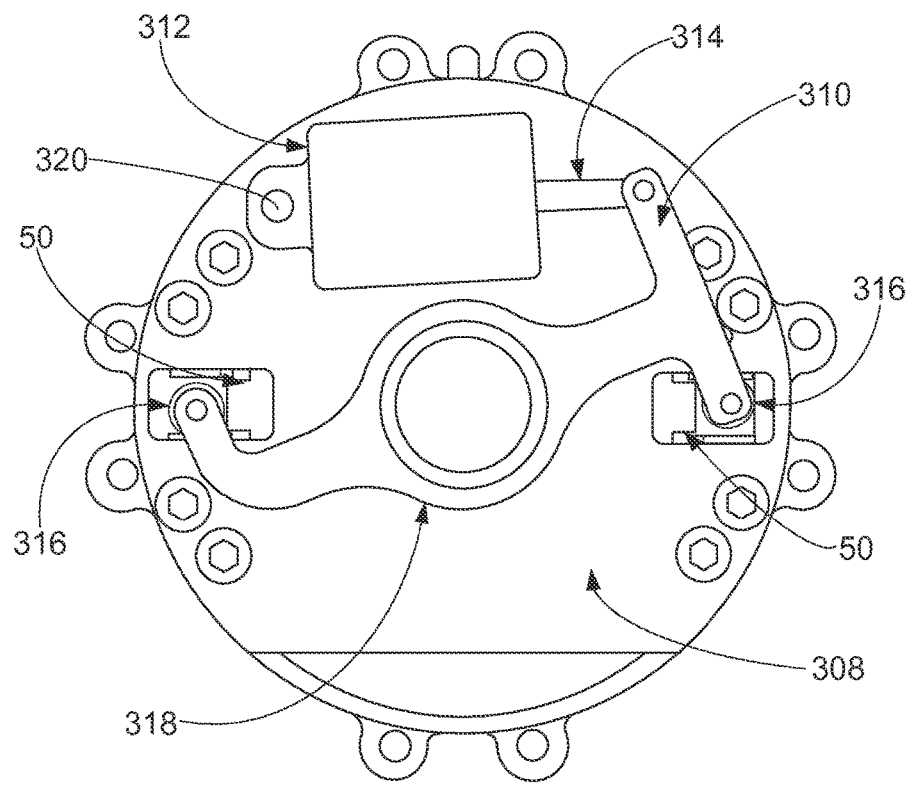
Figure 45:
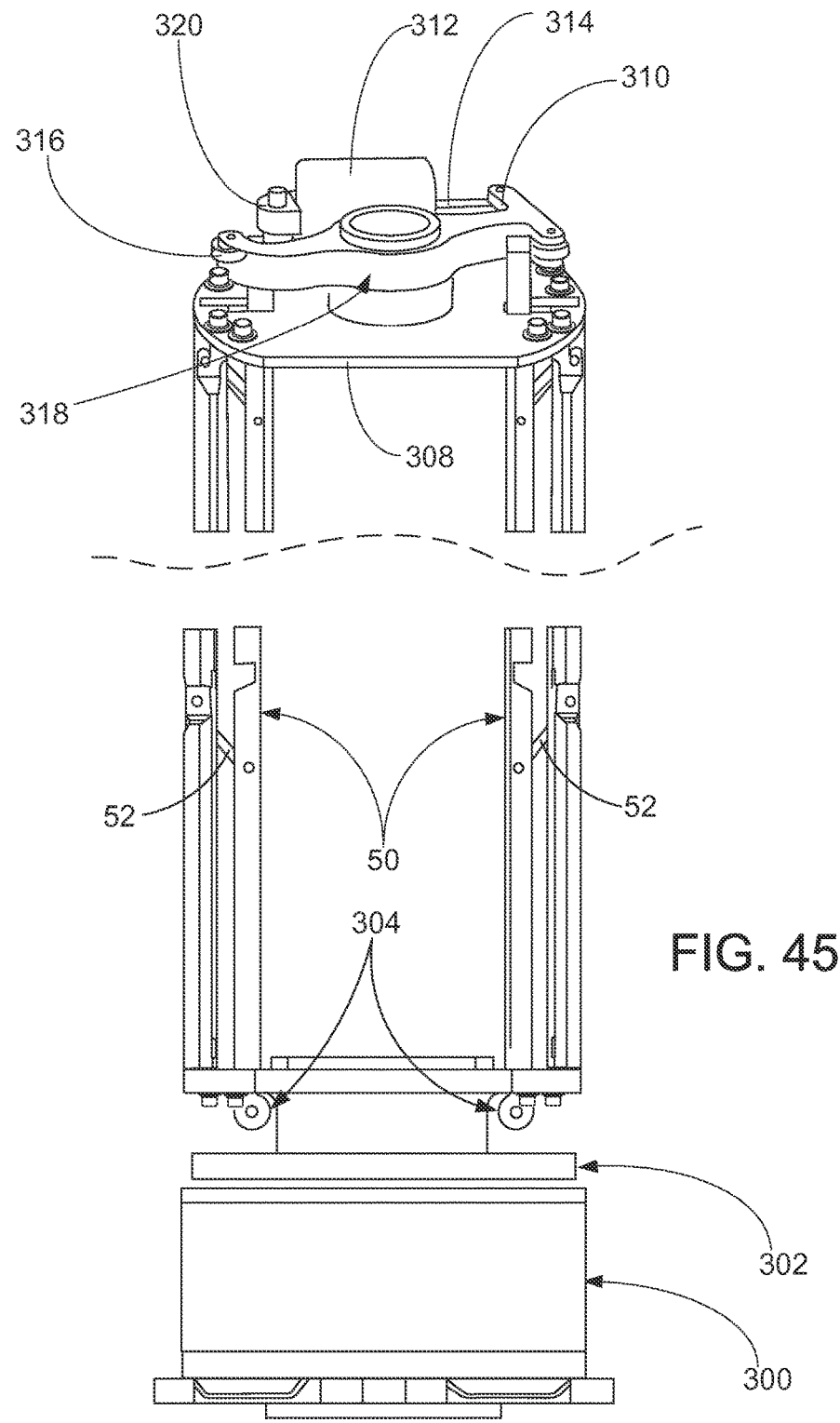
Figure 46:
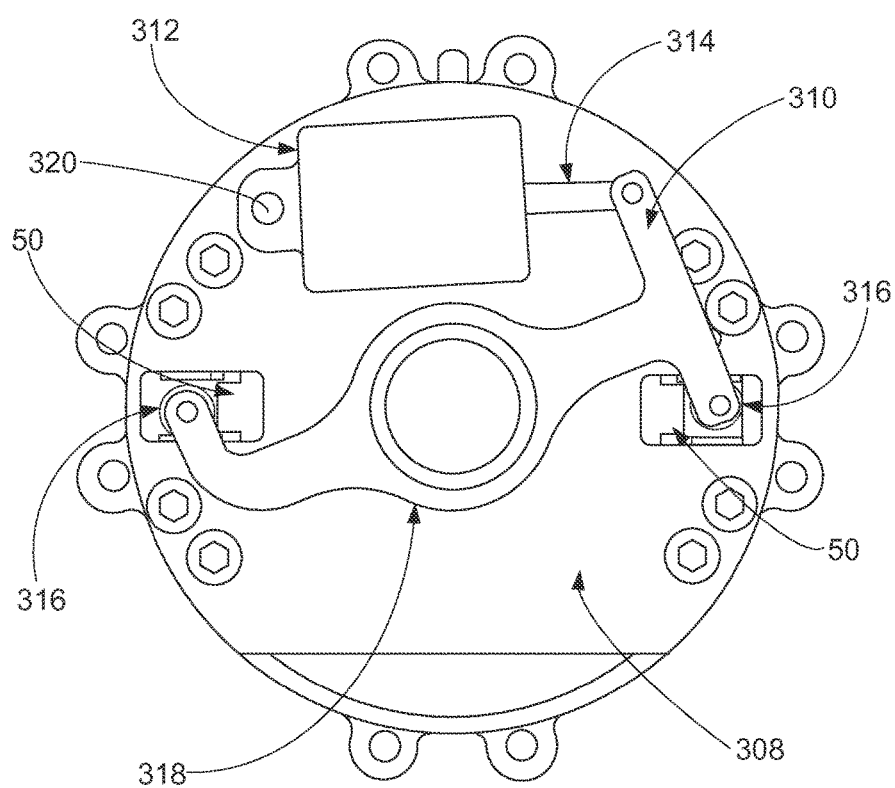
Figure 47:
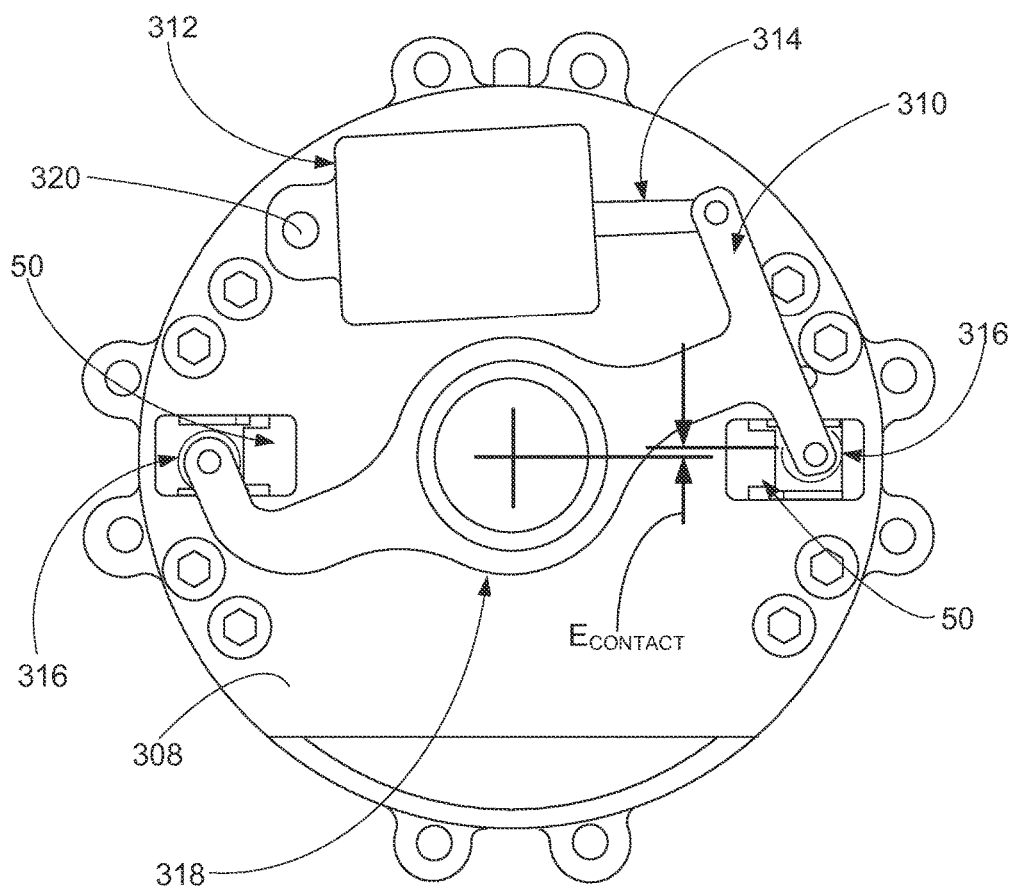
Figure 48:
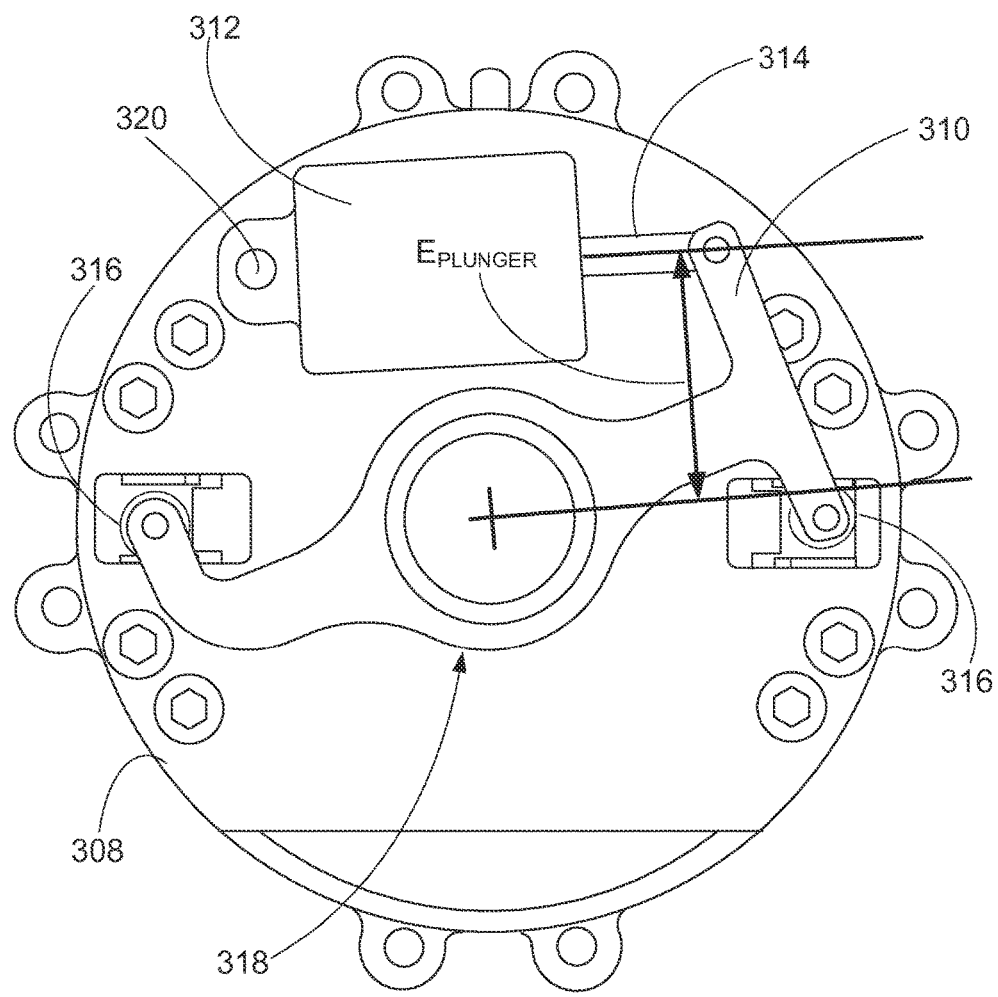

FIG. 39 shows a diagrammatic side view of the cam assembly, in which the lift system (comprising electric solenoid or hydraulic cylinder 300 and piston 302 in conjunction with cam bar lift rollers 304) is deactivated and the hold mechanism (diagrammatically shown in a tilted view) is also deactivated. FIG. 40 shows a top view of the deactivated hold mechanism corresponding to FIG. 39. FIG. 41 shows a diagrammatic side view of the cam assembly in which the lift system is activated and the hold mechanism is still deactivated. FIG. 42 shows a top view of the deactivated hold mechanism corresponding to FIG. 41. FIG. 43 shows a diagrammatic side view of the cam assembly in which both the lift system and the hold mechanism are activated, and FIG. 44 shows a corresponding top view of the activated hold mechanism. FIG. 45 shows a diagrammatic side view of the cam assembly in which the lift system is deactivated and the hold mechanism is still activated, and FIG. 46 shows a corresponding top view of the activated hold mechanism. FIGS. 47 and 48 illustrate geometric aspects of the hold mechanism.

The hold mechanism of the embodiment of FIGS. 39-48 keeps the four-bar linkage cam system 50, 52 in the engaged position during rod translation and hold functions, and provides the SCRAM functionality when subsequently deactivated. It also structurally internalizes the majority of the cam bar retention force required to hold the latches in the engaged position, and utilizes mechanical advantage to minimize the remaining hold force, resulting in a structurally efficient unit.

FIGS. 39 and 40 illustrate the holding mechanism (and associated lift system in FIG. 39) both in the deactivated state. The holding mechanism including a rotary hold bar 310, a hold-solenoid 312 (where the housing of the solenoid 312 is visible), a hold-solenoid plunger 314, and hold-bar rollers 316, is located at the top or base plate 308 of the cam bar assembly. FIGS. 39 and 40 illustrate the hold mechanism deactivated at startup. Prior to startup, the lift system (electric solenoid or hydraulic), which includes the electric solenoid or hydraulic cylinder 300 and the lift plunger or piston 302, is also deactivated. Therefore, the latches are not engaged by the four-bar cam system 50, 52, rendering the connecting rod and attached control rods in the fully inserted position. As best seen in the top view of FIG. 40, in the unlatched state of the four-bar linkage 50, 52 the cam bars 50 are in their outboard positions (i.e., moved outward and away from the latches). Also note that the base plate 308 includes slots to accommodate movement of the upper ends of the cam bars 50 between their inboard (i.e. moved in) and outboard (i.e. moved out) horizontal positions.

With reference to FIGS. 41 and 42, upon activation of the lift system (shown in FIG. 41), the lift plunger or piston 302 raises the cam bars 50 into the latch engagement position by contact with the cam bar lift rollers 304. At initial engagement of the lift mechanism, the hold mechanism is still deactivated as depicted in FIGS. 41 and 42. Because of activation of the lift system, the latches are now engaged with the connecting rod which is resting with the attached control rods at the fully inserted position. As best seen in FIG. 42, the lifting of the cam bars 50 also moves the cam bars 50 into their inboard positions by action of the four-bar linkage, and this inward movement is what engages the latches, as described in more detail with reference to the embodiments of FIGS. 2-6.

With reference to FIGS. 43 and 44, subsequently following activation of the lift system, the hold solenoid 312 of the hold mechanism is activated, resulting in extension of the solenoid plunger 314, which rotates the hold bar 310 about a pivoting engagement 318 of the hold bar 310 with the base plate 308. At full extension of the solenoid plunger 314, the hold-bar rollers 316 are rotated into position behind the upper extremity (i.e. upper ends) of the cam bars 50 (note again that the upper ends of the cam bars 50 protrude through the slots in the base plate 308), so as to function in the hold capacity. It is noted that the hold solenoid 312 is free to pivot about a post mount 320 that secures the solenoid 312 on the base plate 308. It is also noted that the solenoid plunger 314 is pin-connected to the hold bar 310, which provides rotational freedom for operation. The relative orientations of all the pertinent components at this phase of operation are illustrated in FIGS. 43 and 44.

With reference to FIGS. 45 and 46, with the hold mechanism activated the lift system can be deactivated, with the hold system thereafter keeping the latches engaged. Upon deactivation of the lift system, the lift plunger or piston 302 is released, and therefore, no longer (bottom) supports the cam bars 50. At this point, the cam bars 50 are retained in the engaged position solely by the hold mechanism. The four-bar cam system 50, 52 is now being retained for long-term retention of the connecting rod by the hold mechanism.

With reference to FIG. 47, there exists an eccentricity $E_{contact}$ between the center of rotation of the hold bar 310 and the line of action of the contact force between (the upper end of) the cam bar 50 and the hold-bar roller 316. This eccentricity $E_{contact}$ results in a force-moment imbalance on the hold bar 310 when the force applied by the hold solenoid 312 is removed. This moment imbalance at power loss to the hold solenoid 312 is the driving mechanism for rapidly rotating the hold bar 310 and the attached rollers 316 out of contact with the cam bars 50—resulting in SCRAM (rapid release of connecting rod). In order to create a smooth rolling action of the hold-bar rollers 316 on the contact surface of the cam bars 50, the contact surface is contoured to the arc of the rolling-contact point.

With continuing reference to FIG. 47 and with further reference to FIG. 48, the desired lower power consumption of the hold mechanism is a product of the significant mechanical advantage of the unit. The moment arm $E_{plunger}$ of the hold solenoid plunger 314, relative to the pivot center of the hold bar 310, is significantly larger than the moment arm of the cam bar 50 at the hold-bar roller 316, as illustrated in FIGS. 47 and 48. Therefore, the force required by the hold solenoid 312 is significantly less than the latch-to-cam bar contact force required to support the connecting rod load. Of further advantage, internalization of the majority of the cam bar retention forces as equal and opposite loads reacted through the hold bar 310 eliminates force reaction through the remainder of the hold mechanism, resulting in a structurally efficient unit.

As previously stated, the hold mechanism described with reference to FIGS. 39-48 separates latch activation and long term hold/translation functions, resulting in reduction of operational power requirements. The hold mechanism keeps the four-bar linkage cam system in the engaged position during rod translation and hold functions, and provides the SCRAM functionality when subsequently deactivated. It also structurally internalizes the majority of the cam bar retention force required to hold the latches in the engaged position, and utilizes mechanical advantage to minimize the remaining hold force, resulting in a structurally efficient unit.

Figure 49:
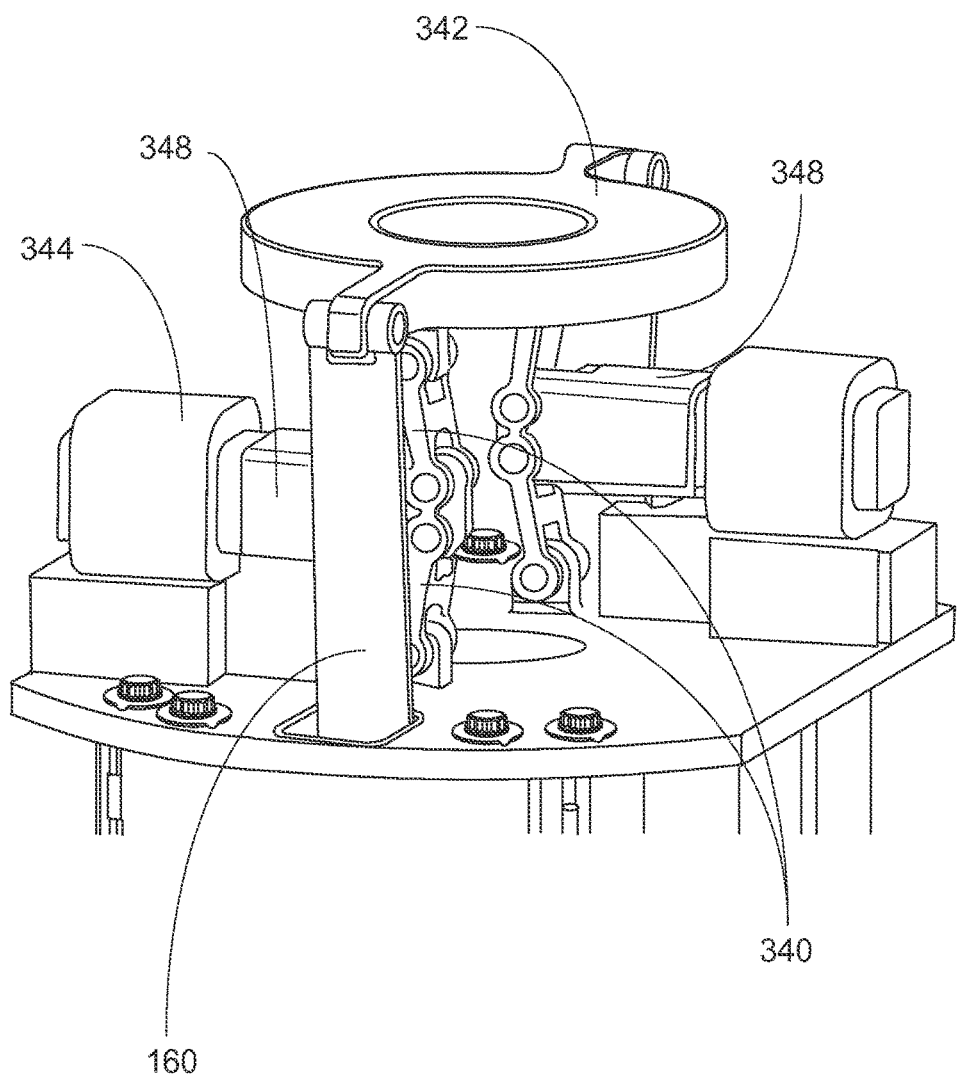
FIGS. 49-52 diagrammatically show aspects of another illustrative holding mechanism suitably used in, for example, the CRDM of FIGS. 3-6 or the CRDM of FIGS. 7-18.
Figure 50:
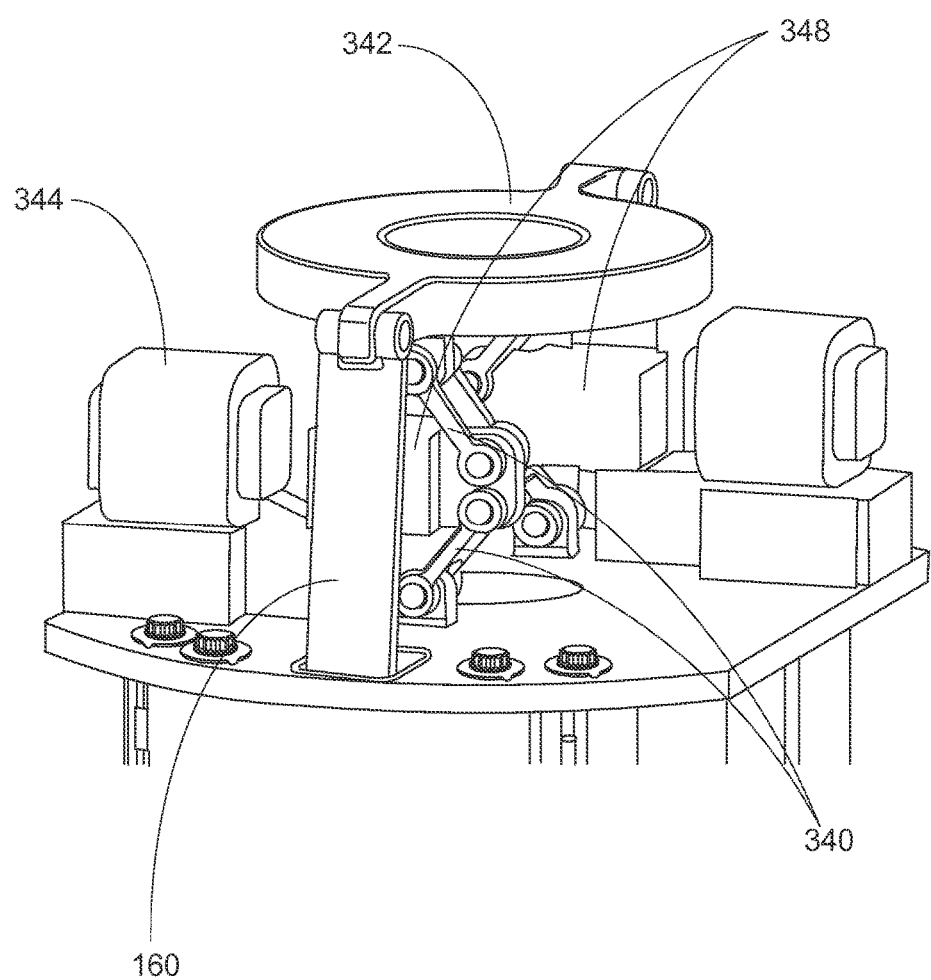
Figure 51:
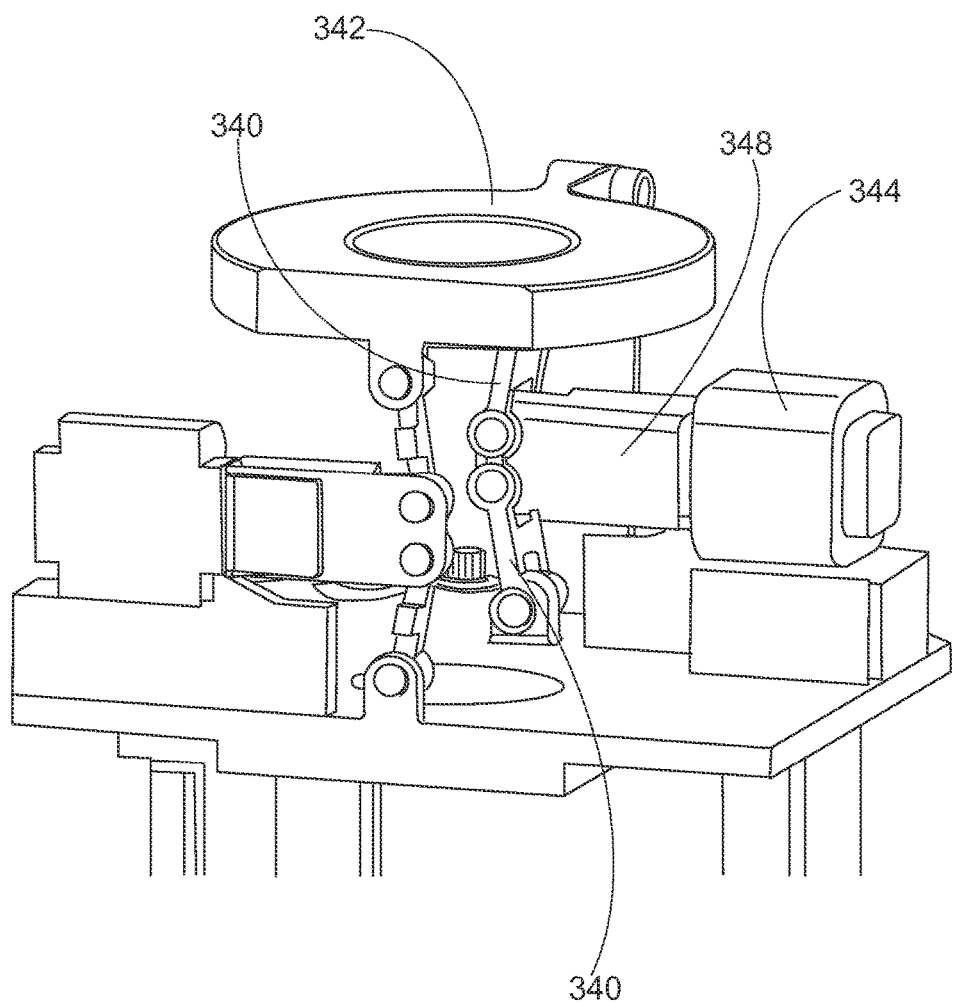

With reference to FIGS. 49-52, another holding mechanism embodiment for a CRDM is described, which may be used in combination with the embodiment of FIGS. 3-6 or substituted for the holding mechanism 150 of the embodiment of FIGS. 7-18. FIG. 49 shows an isometric view of the top region of the CRDM including the holding mechanism with the vertical linkage engaged to raise the cam bars. FIG. 50 shows a corresponding isometric view with the vertical linkage disengaged to allow the cam bars to fall. FIG. 51 corresponds to the engaged view of FIG. 49 but includes a partial cutaway, and similarly FIG. 52 corresponds to the disengaged view of FIG. 50 but includes the partial cutaway.

The latch holding mechanism of FIGS. 49-52 utilizes a vertical linkage system including vertical links 340 connected to a hanger 342 disposed between (the upper ends of) the cam bars 160 of FIGS. 7-18 (as shown; or, alternatively, the cam bars 50 of FIGS. 2-6) and (in the engaged position shown in FIGS. 49 and 51) held in the engaged position by electromagnets 344. When the cam bars 160 are moved to the engaged position by the separate latch engagement mechanism (e.g. as in the embodiment of FIGS. 3-6, or the embodiment of FIGS. 7-18), it causes the hanger 342 to move up which, in turn, raises the vertical links 340 to a position where horizontal drive members 348 are in close proximity with the electromagnets 344. When power is applied to the electromagnets 344 they attract and hold magnets that are embedded into the horizontal drive members 348. (Alternatively, the horizontal members 348 may be made of steel or another ferromagnetic material but not include magnets). The restrained vertical links 340, in turn, hold the hanger 342, and thus the cam bars 160, in the engaged position and thereby maintain latch engagement.

Figure 52:
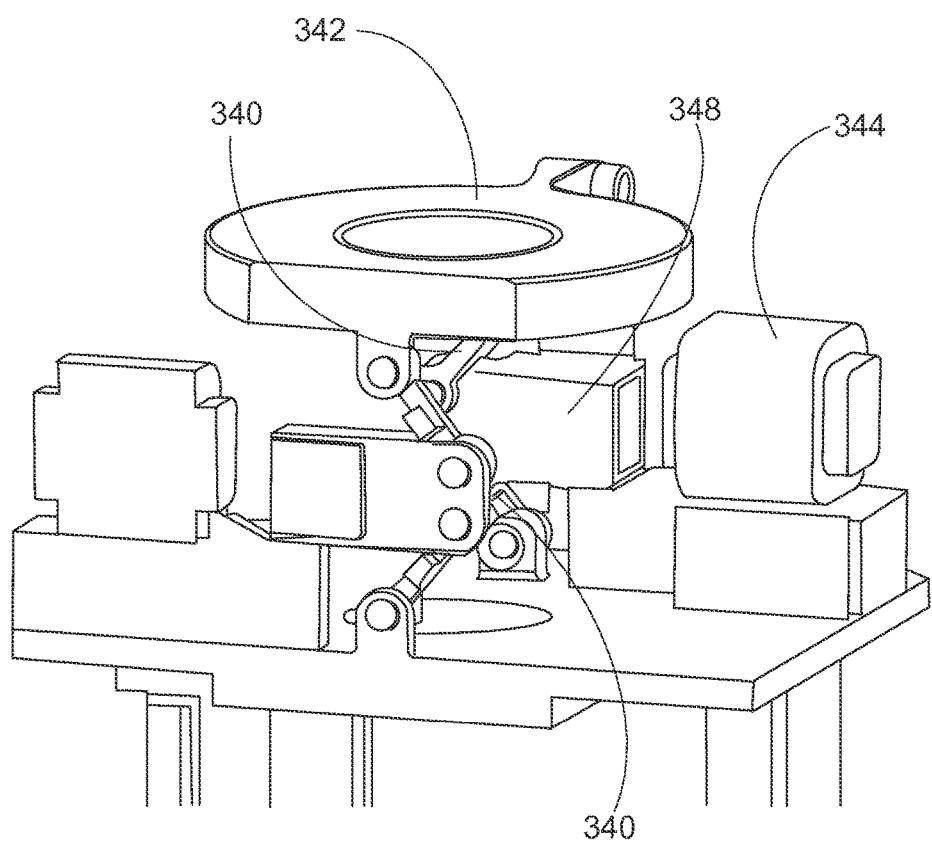

When power is cut to the electromagnets 344, the attractive force between the electromagnets 344 and the horizontal drive members 348 is severed, allowing the vertical links 340 to drop out of engagement, as seen in FIGS. 50 and 52. The weight of the translating assembly is sufficient to disengage the latches and move the cam bars 160 away for SCRAM. During this action, the linkage system freely moves downward out of the way.

To recap, FIGS. 49 and 50 show isometric views of the top region of the CRDM at a viewing angle of approximately 45° for the engaged and disengaged states, respectively. FIG. 49 shows the vertical linkage system in the fully engaged (full up) position, either held by the electromagnets 344 or engaged by an outside means prior to powering the electromagnets. For the SCRAM mode, shown in FIG. 50, the linkage system has moved full down for the latches to completely release the connecting rod and control rod assembly.

FIGS. 51 and 52 show isometric cutaway views of the top region of the CRDM for the engaged and disengaged states, respectively. FIG. 51 shows the vertical linkage system in the fully engaged (full up) position, either held by the electromagnets 344 or engaged by an outside means prior to powering the electromagnets 344. FIG. 52 shows the linkage system in the full down (SCRAM) position.

In the illustrative embodiment, the minimum angle of the vertical links 340, in the fully engaged position (FIGS. 49 and 51), is set to about 10° which is expected to assure an adequate SCRAM reliability margin. In the disengaged position (FIGS. 50 and 52) the vertical links 340 collapse to a maximum angle of about 40° in the illustrative embodiment.

The latch holding mechanism described with reference to FIGS. 49-52 provides a mechanical advantage due to the configuration of the linkage system. This is due to the relative positions and size of the vertical link 340 lengths compared to the horizontal drive member 348. In addition, the permanent magnet that is embedded in the horizontal arm 348 provides added holding force. The true mechanical advantage for this disclosed vertical linkage system is calculated to be 2.9:1 at the minimum link angle. However, the effective mechanical advantage is higher, estimated to be closer to 4.0:1, when an assumed permanent magnet force per link assembly is added. Because of this mechanical advantage, the required holding force needed by the electromagnets is reduced. This results in smaller, less complex electromagnets, as well as lower power demands for operation.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A control rod drive mechanism (CRDM) comprising:
   a hollow lead screw;
   a lifting rod having an upper end disposed in the hollow lead screw;
   latches secured to the lead screw and configured to latch the upper end of the lifting rod to the lead screw;
   a latch engagement mechanism configured to close the latches onto the upper end of the lifting rod; and
   a latch holding mechanism configured to hold the latches closed; and
   a four-bar linkage including cam bars, the four-bar linkage configured to drive the cam bars inward to cam the latches closed responsive to operation of the latch engagement mechanism, the latch holding mechanism configured to hold the cam bars in the inward position to keep the latches closed;
   wherein the latch holding mechanism is separate from the latch engagement mechanism and the four-bar linkage is configured to bias the latches closed under force of gravity.

2. The CRDM of claim 1 wherein the latch engagement mechanism operates responsive to lowering the latches over the upper end of the lifting rod and is not effective to keep the latches closed when the latches are raised again after the latch engagement mechanism operates.

3. The CRDM of claim 2 wherein the latch holding mechanism is located at a top of the CRDM and is configured to engage the upper ends of the cam bars to hold the cam bars in the inward position.

4. The CRDM of claim 3 wherein the latch holding mechanism comprises a magnetic coupling including an electromagnet that when energized magnetically holds the cam bars in the inward position.

5. The CRDM of claim 3 wherein the latch holding mechanism comprises elements configured to move in a horizontal plane responsive to a holding force applied by an actuator to hold the cam bars in the inward position.

6. A nuclear reactor comprising:
   a pressurized water reactor (PWR) including:
      a pressure vessel;
      a reactor core disposed in the pressure vessel; and
      a CRDM as set forth in claim 1 disposed in the pressure vessel.

7. The nuclear reactor of claim 6 wherein the latch holding mechanism is magnetically operated.

8. The nuclear reactor of claim 6 comprising multiple CRDMs, wherein each CRDM has an independent latch holding mechanism.

9. The nuclear reactor of claim 8 wherein the latch holding mechanisms are magnetically operated.

10. The nuclear reactor of claim 9 wherein the latch holding mechanisms operate independent of one another.

11. A control rod drive mechanism (CRDM) including:
    a CRDM motor;
    a hollow lead screw translated under control of the CRDM motor;
    a lifting rod supporting at least one control rod;
    a latch configured to engage a portion of the lifting rod that is disposed in the hollow lead screw so that the lead screw and the lifting rod are non-rotatably secured to each other;
    a latch engagement mechanism configured to close the latch onto the lifting rod;
    a latch holding mechanism, separate from the latch engagement mechanism, configured to hold the latch in its closed position; and
    a four-bar linkage including cam bars, the four-bar linkage being configured to cam the latches closed responsive to operation of the latch engagement mechanism,
    wherein the four-bar linkage is configured to cam the latches closed responsive to operation of the latch engagement mechanism.

12. The CRDM of claim 11 wherein the latch holding mechanism is magnetically actuated.

13. A control rod drive mechanism (CRDM) comprising:
    a lead screw having an upper end;
    a lifting rod having an upper end;
    latches secured to the upper end of the lead screw and configured to latch the upper end of the lifting rod to the lead screw;
    a latch engagement mechanism configured to close the latches onto the upper end of the lifting rod;
    a latch holding mechanism configured to hold the latches closed; and
    a four-bar linkage including cam bars, the four-bar linkage configured to drive the cam bars inward to cam the latches closed responsive to operation of the latch engagement mechanism, the latch holding mechanism configured to hold the cam bars in the inward position to keep the latches closed,
    wherein the latch holding mechanism is separate from the latch engagement mechanism and the four-bar linkage is configured to bias the latches closed under force of gravity.

14. The CRDM of claim 13, wherein the lead screw is hollow and the upper end of the lifting rod is disposed in the lead screw.

15. The CRDM of claim 13 wherein the latch engagement mechanism operates responsive to lowering the latches over the upper end of the lifting rod and is not effective to keep the latches closed when the latches are raised again after the latch engagement mechanism operates.

* * * * *